United States Patent
Shibuya et al.

(10) Patent No.: US 9,979,110 B2
(45) Date of Patent: *May 22, 2018

(54) ELECTRONIC COMPONENT METAL MATERIAL AND METHOD FOR MANUFACTURING THE SAME

(71) Applicant: JX NIPPON MINING & METALS CORPORATION, Tokyo (JP)

(72) Inventors: Yoshitaka Shibuya, Ibaraki (JP); Kazuhiko Fukamachi, Ibaraki (JP); Atsushi Kodama, Ibaraki (JP)

(73) Assignee: JX Nippin Mining & Metals Corporation, Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 14/433,287

(22) PCT Filed: Oct. 31, 2012

(86) PCT No.: PCT/JP2012/078202
§ 371 (c)(1),
(2) Date: Apr. 2, 2015

(87) PCT Pub. No.: WO2014/054190
PCT Pub. Date: Apr. 10, 2014

(65) Prior Publication Data
US 2015/0255906 A1 Sep. 10, 2015

(30) Foreign Application Priority Data
Oct. 4, 2012 (JP) .................................. 2012-222568

(51) Int. Cl.
*B32B 15/01* (2006.01)
*H01R 13/03* (2006.01)
(Continued)

(52) U.S. Cl.
CPC ............. *H01R 13/03* (2013.01); *B32B 15/01* (2013.01); *C22C 5/06* (2013.01); *C22C 13/00* (2013.01);
(Continued)

(58) Field of Classification Search
CPC ... H01R 13/03; B32B 15/01; B32B 2307/528; C22C 5/06; C22C 13/00; C22C 19/03;
(Continued)

(56) References Cited

U.S. PATENT DOCUMENTS 5,384,204 A    1/1995   Yumoto et al.
5,422,451 A *  6/1995   Herklotz ............. B23K 35/004
                                                    200/262
(Continued)

FOREIGN PATENT DOCUMENTS

CN    102575369 A    8/2015
JP    61-124597 A    6/1986
(Continued)

OTHER PUBLICATIONS

Sakurai, Takeshi, Machine Translation of WO 2010119489 A1, Oct. 21, 2010.*
(Continued)

*Primary Examiner* — David Sample
*Assistant Examiner* — Elizabeth Collister
(74) *Attorney, Agent, or Firm* — Drinker Biddle & Reath LLP

(57) ABSTRACT

There are provided an electronic component metal material having low insertability/extractability, low whisker formability and high durability, and a method for manufacturing the electronic component metal material. The electronic component metal material 10 includes a base material 11, an A layer 14 constituting an outermost surface layer on the base material 11 and formed of Sn, In or an alloy thereof, and
(Continued)

a B layer 13 constituting a middle layer provided between the base material 11 and the A layer 14 and formed of Ag, Au, Pt, Pd, Ru, Rh, Os, Ir or an alloy thereof, wherein the outermost surface layer (A layer) 14 has a thickness larger than 0.2 µm, and the middle layer (B layer) 13 has a thickness of 0.001 µm or larger.

24 Claims, 1 Drawing Sheet

(51) Int. Cl.
*C25D 5/10* (2006.01)
*C25D 5/50* (2006.01)
*C22C 5/06* (2006.01)
*C22C 13/00* (2006.01)
*C22C 19/03* (2006.01)
*C22C 9/00* (2006.01)
*C22C 28/00* (2006.01)

(52) U.S. Cl.
CPC ............. *C22C 19/03* (2013.01); *C25D 5/10* (2013.01); *C25D 5/505* (2013.01); *C22C 9/00* (2013.01); *C22C 28/00* (2013.01); *Y10T 428/12715* (2015.01); *Y10T 428/12722* (2015.01)

(58) Field of Classification Search
CPC .......... C22C 28/00; C22C 9/00; C25D 5/505; Y10T 428/12715; Y10T 428/12722; Y10T 428/12472
USPC ......... 439/884, 885, 886, 887; 428/612, 646
See application file for complete search history.

(56) References Cited

U.S. PATENT DOCUMENTS

| | | | |
|---|---|---|---|
| 6,548,898 B2* | 4/2003 | Matsuki | H01L 23/49811 257/701 |
| 7,391,116 B2* | 6/2008 | Chen | C25D 5/10 257/635 |
| 9,576,693 B2* | 2/2017 | Shibuya | B32B 15/01 |
| 9,580,783 B2* | 2/2017 | Shibuya | C25D 5/10 |
| 2004/0038072 A1 | 2/2004 | Miura | |
| 2006/0292847 A1 | 12/2006 | Schetty, III | |
| 2011/0012497 A1 | 1/2011 | Sumiya et al. | |
| 2012/0107639 A1 | 5/2012 | Takamizawa et al. | |

FOREIGN PATENT DOCUMENTS

| | | | | |
|---|---|---|---|---|
| JP | 01-306574 A | 12/1989 | | |
| JP | 02-301573 A | 12/1990 | | |
| JP | 09-078287 A | 3/1997 | | |
| JP | 11-229178 A | 8/1999 | | |
| JP | 2003-129278 A | 5/2003 | | |
| JP | 2004-190065 A | 7/2004 | | |
| JP | 2011-122234 A | 6/2011 | | |
| WO | WO-2010119489 A1 * | 10/2010 | ............... | C25D 5/12 |

OTHER PUBLICATIONS

ZIF Connector & Flat Flexible Cable, Wurth Elektronic, Sep. 2008, p. 2, [online] [retreived Apr. 4, 2017]. Retrieved from the Internet:<https://media.digikey.com/pdf/Date%20Sheets/Wurth%20Electronics%20PDFs/ZiF%20Conn_Flat%20Flexible%20Cable.pdf>.*
Supplementary Partial European Search Report for Application No. EP 12 88 6112 dated Jul. 19, 2016, 10 pages.
English translation of the International Preliminary Report on Patentability, dated Apr. 7, 2015 for PCT/JP2012/078202.

* cited by examiner

ELECTRONIC COMPONENT METAL MATERIAL AND METHOD FOR MANUFACTURING THE SAME

TECHNICAL FIELD

The present invention relates to an electronic component metal material and a method for manufacturing the metal material.

BACKGROUND ART

For connectors being connection components for household and vehicular electronic devices, materials are used in which a Ni or Cu base plating is carried out on the surface of brass or phosphorus bronze, and an Sn or Sn alloy plating is further carried out thereon. The Sn or Sn alloy plating are usually required properties of low contact resistance and high solder wettability, and there is recently further demanded the reduction of the inserting force in engagement of a male terminal and a female terminal formed by press working of plated materials. On the plating surface in manufacture steps, there is in some cases generated whiskers, which are acicular crystals causing problems such as short-circuit, and the whiskers also need to be suppressed well.

By contrast, Patent Literature 1 discloses a silver-coated electric material in which on a base material whose surface layer has a thickness of 0.05 μm or larger from the surface of the base material and is composed of Ni, Co or an alloy thereof, Ag or an Ag alloy is partially coated, and on the exposed base material surface and on the partially coated Ag or Ag alloy layer, In, Zn, Sn, Pd or an alloy thereof is coated in a thickness of 0.01 to 1.0 μm. According to the Patent Literature, it is described that the electric material can maintain the solderability excellent as an electric material and the connectivity of the mechanical electric connection over a long period.

Patent Literature 2 discloses an Sn or Sn alloy-coated material in which a first coating layer of Ni, Co or an alloy containing these is provided on a Cu or Cu alloy base material surface, and a second coating layer of Ag or an Ag alloy is provided thereon, and an Sn or Sn alloy coating layer is further provided thereon. According to the Patent Literature, it is described that there can be provided an Sn or Sn alloy-coated material which exhibits no oxidative discoloration of the surface and little increase in the contact resistance in spite of being used at high temperatures, thus exhibiting good appearance and contact property over a long period.

Patent Literature 3 discloses an Sn or Sn alloy-coated material in which a first coating layer of Ni, Co or an alloy containing these is provided on a Cu or Cu alloy base material surface, and a second coating layer of Ag or an Ag alloy is provided thereon, and a hot-dipped solidified coating layer of Sn or an Sn alloy is further provided thereon. According to the Patent Literature, it is described that there can be provided an Sn or Sn alloy-coated material which exhibits no oxidative discoloration of the surface and little increase in the contact resistance in spite of being used at high temperatures, thus exhibiting good appearance and contact property over a long period.

Patent Literature 4 discloses an electric contact material in which an Ag layer or an Ag alloy layer is coated on one surface of a conductive strip, and an Sn layer or an Sn alloy layer is coated on the other surface. According to the Patent Literature, it is described that there can be provided an electric contact material or an electric contact component exhibiting little deterioration of solderability even if being exposed to the sulfurization environment or the like.

Patent Literature 5 discloses a method for preventing tin whiskers by a pretreatment in which method (a) one of underlayer metal thin films selected from the group consisting of silver, palladium, platinum, bismuth, indium, nickel, zinc, titanium, zirconium, aluminum, chromium and antimony is formed on a plating object, and thereafter, (b) a tin or tin alloy plated film is formed on the underlayer metal thin film. According to the Patent Literature, it is described that in the tin-based film formed to well secure solderability and the like on the surface of a plating object including a copper-based bare surface, tin whiskers can effectively be prevented by a simple operation.

Patent Literature 6 discloses a plated structure obtained by heat-treating a silver plated structure in which a silver plated layer is formed on the surface of a substrate to be plated, and a tin, indium or zinc plating layer of a thickness of 0.001 to 0.1 pun is further formed on the surface of the silver plated layer. According to the Patent Literature, it is described that there can be provided a support, for housing light emitting elements, being excellent in heat resistance and exhibiting little decrease in the reflectance due to sulfurization of silver, and a coating method of electric components which provides electronic components hardly undergoing discoloration due to sulfurization, having gloss innate in silver, and having a low contact resistance.

CITATION LIST

Patent Literature

[Patent Literature 1]-Japanese Patent Laid-Open No. 61-124597
[Patent Literature 2]-Japanese Patent Laid-Open No. 1-306574
[Patent Literature 3]-Japanese Patent Laid-Open No. 2-301573
[Patent Literature 4]-Japanese Patent Laid-Open No. 9-78287
[Patent Literature 5]-Japanese Patent Laid-Open No. 2003-129278
[Patent Literature 6]-Japanese Patent Laid-Open No. 2011-122234

SUMMARY OF INVENTION

Technical Problem

However, the technology described in Patent Literature 1 has such a problem that the contact resistance in the region where Sn is formed ultrathin becomes high.

The technologies described in Patent Literatures 2 to 5 give good solder wettability and contact property, but cannot be said to give the satisfactory insertability/extractability and the satisfactory suppression of whiskers.

The technology described in Patent Literature 6, though improving the contact resistance, cannot be said to give the satisfactory solder wettability.

The conventional metal materials for electronic components having an Sn/Ag/Ni base plating structure have thus problems in the insertability/extractability and the whiskers; and even if specifications are made which pose no problems in the insertability/extractability and the whiskers, the specifications are difficult to make so as to satisfy the durability (heat resistance, gas corrosion resistance, high solder wettability), which are not made clear.

The present invention has been achieved to solve the above-mentioned problems, and has objects of providing an electronic component metal material having low insertability/extractability (low insertability/extractability means a low insertion force produced when a male terminal and a female terminal are engaged), low whisker formability and high durability, and a method for manufacturing the metal material.

Solution to Problem

As a result of exhaustive studies, the present inventors have found that an electronic component metal material which has all of low insertability/extractability, low whisker formability and high durability can be fabricated by providing a middle layer and an outermost surface layer in order on a base material, using predetermined metals as the middle layer and the outermost surface layer, respectively, and forming these in predetermined thicknesses or deposition amounts, respectively.

One aspect of the present invention having been achieved based on the above finding is an electronic component metal material having low whisker formability and high durability, and comprising a base material, an A layer constituting an outermost surface layer on the base material and being formed of Sn, In or an alloy thereof, and a B layer constituting a middle layer provided between the base material and the A layer and being formed of Ag, Au, Pt, Pd, Ru, Rh, Os, Ir or an alloy thereof, wherein the outermost surface layer (A layer) has a thickness larger than 0.2 µm, and the middle layer (B layer) has a thickness of 0.001 µm or larger.

Another aspect of the present invention is an electronic component metal material having low whisker formability and high durability, and comprising a base material, an A layer constituting an outermost surface layer on the base material and being formed of Sn, In or an alloy thereof, and a B layer constituting a middle layer provided between the base material and the A layer, and being formed of Ag, Au, Pt, Pd, Ru, Rh, Os, Ir or an alloy thereof, wherein the outermost surface layer (A layer) has a deposition amount of Sn, In or alloy thereof of larger than 150 µg/cm², and the middle layer (B layer) has a deposition amount of Ag, Au, Pt, Pd, Ru, Rh, Os, Ir or alloy thereof of 1 µg/cm² or more.

In one example of the electronic component metal material according to the present invention, the outermost surface layer (A layer) has an alloy composition having 50 mass % or more of Sn, In or the total of Sn and In, and the other alloy component(s) is composed of one or two or more metals selected from the group consisting of Ag, As, Au, Bi, Cd, Co, Cr, Cu, Fe, Mn, Mo, Ni, Pb, Sb, W, and Zn.

In another example of the electronic component metal material according to the present invention, the middle layer (B layer) has an alloy composition comprising 50 mass % or more of Ag, Au, Pt, Pd, Ru, Rh, Os, Ir or the total of Ag, Au, Pt, Pd, Ru, Rh, Os and Ir, and the other alloy component(s) comprising one or two or more metals selected from the group consisting of Bi, Cd, Co, Cu, Fe, In, Mn, Mo, Ni, Pb, Sb, Se, Sn, W, Tl, and Zn.

In further another example of the electronic component metal material according to the present invention, the outermost surface layer (A layer) has a surface arithmetic average height (Ra) of 0.1 µm or lower.

In further another example of the electronic component metal material according to the present invention, the outermost surface layer (A layer) has a surface maximum height (Rz) of 1 µm or lower.

In further another example of the electronic component metal material according to the present invention, the outermost surface layer (A layer) has a surface reflection density of 0.3 or higher.

In further another example of the electronic component metal material according to the present invention, when a depth analysis by XPS (X-ray photoelectron spectroscopy) is carried out, a position ($D_1$) where the atomic concentration (at %) of Sn or In in the outermost surface layer (A layer) is a maximum value and a position ($D_2$) where the atomic concentration (at %) of Ag, Au, Pt, Pd, Ru, Rh, Os or Ir in the middle layer (B layer) is a maximum value are present in the order of $D_1$ and $D_2$ from the outermost surface.

In further another example of the electronic component metal material according to the present invention, when a depth analysis by XPS (X-ray photoelectron spectroscopy) is carried out, the middle layer (B layer) has a maximum value of an atomic concentration (at %) of Ag, Au, Pt, Pd, Ru, Rh, Os or Ir of 10 at % or higher.

In further another example of the electronic component metal material according to the present invention, the metal material further comprises a C layer provided between the base material and the B layer and constituting an underlayer, and formed of one or two or more selected from the group consisting of Ni, Cr, Mn, Fe, Co, and Cu.

In further another example of the electronic component metal material according to the present invention, the underlayer (C layer) has an alloy composition comprising 50 mass % or more of the total of Ni, Cr, Mn, Fe, Co, and Cu, and further comprising one or two or more selected from the group consisting of B, P, Sn, and Zn.

In further another example of the electronic component metal material according to the present invention, when a depth analysis by XPS (X-ray photoelectron spectroscopy) is carried out, a position ($D_1$) where the atomic concentration (at %) of Sn or In in the outermost surface layer (A layer) is a maximum value, a position ($D_2$) where the atomic concentration (at %) of Ag, Au, Pt, Pd, Ru, Rh, Os or Ir in the middle layer (B layer) is a maximum value and a position ($D_3$) where the atomic concentration (at %) of Ni, Cr, Mn, Fe, Co or Cu of the underlayer (C layer) is a maximum value are present in the order of $D_1$, $D_2$ and $D_3$ from the outermost surface.

In further another example of the electronic component metal material according to the present invention, when a depth analysis by XPS (X-ray photoelectron spectroscopy) is carried out, the middle layer (B layer) has a maximum value of an atomic concentration (at %) of Ag, Au, Pt, Pd, Ru, Rh, Os or Ir of 10 at % or higher; and a depth where the underlayer (C layer) has an atomic concentration (at %) of Ni, Cr, Mn, Fe, Co or Cu of 25% or higher is 50 nm or more.

In further another example of the electronic component metal material according to the present invention, the underlayer (C layer) has a thickness of 0.05 µm or larger.

In further another example of the electronic component metal material according to the present invention, the underlayer (C layer) has a deposition amount of Ni, Cr, Mn, Fe, Co, or Cu of 0.03 mg/cm² or larger.

In further another example of the electronic component metal material according to the present invention, the outermost surface layer (A layer) has a thickness larger than 0.2 µm and smaller than 0.6 µm.

In further another example of the electronic component metal material according to the present invention, the outermost surface layer (A layer) has a deposition amount of Sn, In or an alloy thereof of larger than 150 µg/cm$^2$ and smaller than 450 µg/cm$^2$.

In further another example of the electronic component metal material according to the present invention, the middle layer (B layer) has a thickness of 0.005 to 0.1 µm.

In further another example of the electronic component metal material according to the present invention, the middle layer (B layer) has a deposition amount of Ag, Au, Pt, Pd, Ru, Rh, Os, Ir or an alloy thereof of 4 to 120 µg/cm$^2$.

In further another example of the electronic component metal material according to the present invention, the underlayer (C layer) has a surface Vickers hardness of Hv300 or higher.

In further another example of the electronic component metal material according to the present invention, the surface Vickers hardness and the thickness of the underlayer (C layer) satisfy the following expression:

Vickers hardness ($Hv$)≥−376.22 Ln (thickness: µm)+ 86.411.

In further another example of the electronic component metal material according to the present invention, the underlayer (C layer) has a surface indentation hardness of 2,500 MPa or higher, the indentation hardness being a hardness acquired by measuring an impression made on the surface of the underlayer (C layer) by a load of 980.7 mN for a load holding time of 15 sec in an ultrafine hardness tester.

In further another example of the electronic component metal material according to the present invention, the underlayer (C layer) has a surface indentation hardness and a thickness satisfying the following expression:

Indentation hardness (MPa)≥−3998.4 Ln (thickness: µm)+1178.9, the indentation hardness being a hardness acquired by measuring an impression made on the surface of the underlayer (C layer) by a load of 980.7 mN for a load holding time of 15 sec by an ultrafine hardness tester.

In further another example of the electronic component metal material according to the present invention, the underlayer (C layer) has a surface Vickers hardness of Hv1,000 or lower.

In further another example of the electronic component metal material according to the present invention, the underlayer (C layer) has a surface indentation hardness of 10,000 MPa or lower, the indentation hardness being a hardness acquired by measuring an impression made on the surface of the underlayer (C layer) by a load of 980.7 mN for a load holding time of 15 sec in an ultrafine hardness tester.

In further another example of the electronic component metal material according to the present invention, the base material is a metal base material, and the metal base material has a surface Vickers hardness of Hv90 or higher.

In further another example of the electronic component metal material according to the present invention, the base material is a metal base material, and the metal base material has a surface indentation hardness of 1,000 MPa or higher, the indentation hardness being a hardness acquired by measuring an impression made on the surface of the metal base material by a load of 980.7 mN for a load holding time of 15 sec in an ultrafine hardness tester.

In further another example of the electronic component metal material according to the present invention, the base material is a metal base material, and the metal base material has an elongation of 5% or higher, the elongation being measured by carrying out a tensile test at a tension rate of 50 mm/min in the rolling-parallel direction of the metal base material according to JIS C 2241.

In further another example of the electronic component metal material according to the present invention, the base material is a metal base material and has a minimum bending radius ratio (MBR/t) of the metal base material of 3 or lower, the minimum bending radius ratio being a ratio of a minimum bending radius (MBR) at which the metal material generates no cracks when being subjected to a W bending test according to the Japan Copper and Brass Association Technical Standard (JCBA) T307 to a thickness (t) of the metal material.

In further another example of the electronic component metal material according to the present invention, when a depth analysis by XPS (X-ray photoelectron spectroscopy) is carried out, between a position ($D_1$) where the atomic concentration (at %) of Sn or In in the outermost surface layer (A layer) exhibits a maximum value and a position ($D_3$) where the atomic concentration (at %) of Ni, Cr, Mn, Fe, Co, Cu or Zn of the underlayer (C layer) exhibits a maximum value, a region having 40 at % or more of Ag, Au, Pt, Pd, Ru, Rh, Os or Ir is present in a thickness of 1 nm or larger.

In further another example of the electronic component metal material according to the present invention, when an elemental analysis of the surface of the outermost surface layer (A layer) is carried out by a survey measurement by XPS (X-ray photoelectron spectroscopy), the content of 0 is lower than 50 at %.

Further another aspect of the present invention is a connector terminal in which the electronic component metal material according to the present invention is used for a contact portion.

Further another aspect of the present invention is a connector in which the connector terminal according to the present invention is used.

Further another aspect of the present invention is an FFC terminal in which the electronic component metal material according to the present invention is used for a contact portion.

Further another aspect of the present invention is an FPC terminal in which the electronic component metal material according to the present invention is used for a contact portion.

Further another aspect of the present invention is an FFC in which the FFC terminal according to the present invention is used.

Further another aspect of the present invention is an FPC in which the FPC terminal according to the present invention is used.

Further another aspect of the present invention is an electronic component in which the electronic component metal material according to the present invention is used for an electrode for external connection.

Further another aspect of the present invention is a method for manufacturing the electronic component metal material according to the present invention, the method comprising steps of forming the outermost surface layer (A layer) and the middle layer (B layer) by surface treatments using wet plating, respectively.

In one embodiment of the method for manufacturing an electronic component metal material according to the present invention, the wet plating is electroplating.

In another embodiment of the method for manufacturing an electronic component metal material according to the present invention, the outermost surface layer (A layer) is formed by a plating treatment using an acidic plating liquid.

In further another embodiment of the method for manufacturing an electronic component metal material according to the present invention, the middle layer (B layer) is formed by a plating treatment using a cyanide-containing plating liquid.

In further another embodiment of the method for manufacturing an electronic component metal material according to the present invention, the method comprises a step of forming the underlayer (C layer) by a plating treatment using a sulfamic acid bath or a Watts bath.

In further another embodiment of the method for manufacturing an electronic component metal material according to the present invention, a plating liquid used in the sulfamic acid bath and the Watts bath is a bright Ni plating liquid.

In further another embodiment of the method for manufacturing an electronic component metal material according to the present invention, a plating liquid to form the underlayer (C layer) contains saccharin as an additive.

Advantageous Effects of Invention

The present invention can provide an electronic component metal material which has low insertability/extractability, low whisker formability and high durability, and a method for manufacturing the metal material.

DESCRIPTION OF EMBODIMENTS

Figure 1:
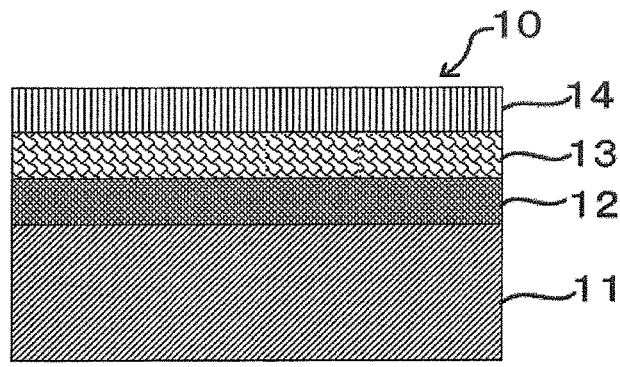
FIG. 1 is an illustrative diagram showing a constitution of an electronic component metal material according to an embodiment of the present invention.

Hereinafter, the electronic component metal material according to embodiments of the present invention will be described. As shown in FIG. 1, in a metal material 10 for electronic components according to the embodiment, an underlayer (C layer) 12 is formed on the surface of a base material 11; a middle layer (B layer) 13 is formed on the surface of the underlayer (C layer) 12; and an outermost surface layer (A layer) 14 is formed on the surface of the middle layer (B layer) 13. A material in which no underlayer (C layer) 12 is formed on the surface of the base material 11, and the middle layer (B layer) 13 is formed on the surface of the base material 11, and the outermost surface layer (A layer) 14 is formed on the surface of the middle layer (B layer) 13 is also an electronic component metal material according to an embodiment of the present invention.

<Constitution of an Electronic Component Metal Material>

(Base Material)

The base material 11 is not especially limited, but usable are metal base materials, for example, copper and copper alloys, Fe-based materials, stainless steels, titanium and titanium alloys, and aluminum and aluminum alloys. Metal base materials may be composited with resin layers. Examples of metal base materials composited with resin layers include electrode portions on FPC base materials or FFC base materials.

The Vickers hardness of the base material 11 is preferably Hv90 or higher. When the Vickers hardness of the base material 11 is Hv90 or higher, the thin film lubrication effect by the hard base material is improved and the insertability/extractability is more reduced.

The indentation hardness of the base material 11 is preferably 1,000 MPa or higher. With the indentation hardness of the base material 11 of 1,000 MPa or higher, the thin film lubrication effect by the hard base material is improved and the inserting/extracting force is more reduced.

The elongation of the base material 11 is preferably 5% or higher. With the elongation of the base material 11 of 5% or higher, the bending workability is improved; and in the case where the electronic component metal material according to the present invention is press-formed, cracks are hardly generated in the formed portion, and the decrease in the gas corrosion resistance (durability) is suppressed.

The minimum bending radius ratio (MBR/t) when a W bending test is carried out on the base material 11 is preferably 3 or lower. With the minimum bending radius ratio (MBR/t) of the base material 11 of 3 or lower, the bending workability is improved; and in the case where the electronic component metal material according to the present invention is press-formed, cracks are hardly generated in the formed portion, and the decrease in the gas corrosion resistance (durability) is suppressed.

(Outermost Surface Layer (A Layer))

The outermost surface layer (A layer) 14 needs to be Sn, In or an alloy thereof. Sn and In, though being oxidative metals, have a feature of being relatively soft among metals. Therefore, even if an oxide film is formed on the Sn and In surface, for example, when the electronic component metal material is used as a contact material for engaging a male terminal and a female terminal, since the oxide film is easily shaven to thereby cause a new surface to be produced and make the contact of metals, a low contact resistance can be provided.

Sn and In are excellent in the gas corrosion resistance to gases such as chlorine gas, sulfurous acid gas and hydrogen sulfide gas; and for example, in the case where Ag, inferior in the gas corrosion resistance, is used for the middle layer (B, layer) 13; Ni, inferior in the gas corrosion resistance, is used for the underlayer (C layer) 12; and copper and a copper alloy, inferior in the gas corrosion resistance, is used for the base material 11, Sn and In have a function of improving the gas corrosion resistance of the electronic component metal material. Here, among Sn and In, Sn is preferable because In is under a strict regulation based on the technical guideline regarding the health hazard prevention of Ministry of Health, Labor and Welfare.

The composition of the outermost surface layer (A layer) comprises 50 mass % or more of Sn, In or the total of Sn and In, and the other alloy component(s) may be constituted of one or two or more metals selected from the group consisting of Ag, As, Au, Bi, Cd, Co, Cr, Cu, Fe, Mn, Mo, Ni, Pb, Sb, W, and Zn. By making the composition of the outermost surface layer (A layer) to be an alloy (for example, carrying out a Sn—Ag plating), the low insertability/extractability, the low whisker formability, the durability (heat resistance, gas corrosion resistance, solder wettability and the like), and the like are more improved in some cases.

The thickness of the outermost surface layer (A layer) 14 needs to be larger than 0.2 µm. The thickness of the outermost surface layer (A layer) 14 is preferably larger than 0.2 µm and smaller than 0.6 µm. When the thickness of the outermost surface layer (A layer) 14 is larger than 0.2 µm, the durability (heat resistance, gas corrosion resistance, solder wettability and the like) is improved. Further when the thickness increases, whiskers are liable to be generated, and the adhesive wear of Sn and In becomes much and the inserting/extracting force also becomes high. In order to provide more sufficiently low whisker formability, the thickness is preferably smaller than 0.6 μm. When the thickness is smaller than 0.6 μm, no whiskers of 20 μm or longer in length are generated.

The deposition amount of Sn, In in the outermost surface layer (A layer) 14 needs to be larger than 150 μg/cm². The deposition amount of the outermost surface layer (A layer) 14 is preferably larger than 150 μg/cm² and smaller than 450 μg/cm². Here, the reason to define the deposition amount will be described. For example, in some cases of measuring the thickness of the outermost surface layer (A layer) 14 by an X-ray fluorescent film thickness meter, for example, due to an alloy layer formed between the outermost surface layer (A layer) and the underneath middle layer (B layer), an error is produced in the value of the measured thickness. By contrast, the case of the control using the deposition amount can carry out more exact quality control, not influenced by the formation situation of the alloy layer. When the deposition amount of Sn, In in the outermost surface layer (A layer) is made to be larger than 150 μg/cm², the gas resistance is improved. Further when the deposition amount increases, whiskers are liable to be generated, and the adhesive wear of Sn and In becomes much and the inserting/extracting force also becomes high. In order to provide more sufficiently low whisker formability, the deposition amount is preferably smaller than 450 μg/cm². When the deposition amount is smaller than 450 μg/cm², no whiskers of 20 μm or longer in length are generated.

(Middle Layer (B Layer))

The middle layer (B layer) 13 needs to be formed of Ag, Au, Pt, Pd, Ru, Rh, Os, Ir, or an alloy thereof. Ag, Au, Pt, Pd, Ru, Rh, Os, and Ir, have a feature of relatively having a heat resistance among metals. Therefore, the middle layer (B layer) suppresses the diffusion of the compositions of the base material 11 and the underlayer (C layer) 12 to the outermost surface layer (A layer) 14 side, and improves the heat resistance. These metals form compounds with Sn and In in the outermost surface layer (A layer) 14 and suppress the oxide film formation of Sn and In, and improve the solder wettability. Among Ag, Au, Pt, Pd, Ru, Rh, Os and Ir, Ag is more desirable from the viewpoint of the conductivity. Ag has a high conductivity. For example, in the case of using Ag for applications of high-frequency signals, the skin effect reduces the impedance resistance.

The alloy composition of the middle layer (B layer) 13 comprises 50 mass % or more of Ag, Au, Pt, Pd, Ru, Rh, Os, Ir, or the total of Ag, Au, Pt, Pd, Ru, Rh, Os and Ir, and the other alloy component(s) may be constituted of one or two or more metals selected from the group consisting of Bi, Cd, Co, Cu, Fe, In, Mn, Mo, Ni, Pb, Sb, Se, Sn, W, Tl, and Zn. By making such an alloy composition (for example, carrying out a Sn—Ag plating), the low insertability/extractability, the low whisker formability, the durability (heat resistance, gas corrosion resistance, solder wettability and the like), and the like are improved in some cases.

The thickness of the middle layer (B layer) 13 needs to be larger than 0.001 μm. The thickness of the middle layer (B layer) 13 is preferably 0.005 to 0.1 μM. When the thickness is smaller than 0.001 μm, the solder wettability is poor. In order to provide more sufficient solder wettability, the thickness is preferably 0.005 μm or larger. Further when the thickness increases, the inserting/extracting force becomes high, and in order to provide more sufficient low insertability/extractability, the thickness is preferably 0.3 μm or smaller, and more preferably 0.1 μm or smaller.

The deposition amount of Ag, Au, Pt, Pd, Ru, Rh, Os, Ir, or an alloy thereof of the middle layer (B layer) 13 needs to be 1 μg/cm² or larger. The deposition amount of the middle layer (B layer) 13 is preferably 4 to 120 μg/cm². Here, the reason of the definition using the deposition amount will be described. For example, in some cases of measuring the thickness of the middle layer (B layer) 13 by an X-ray fluorescent film thickness meter, for example, due to an alloy layer formed between the outermost surface layer (A layer) 14 and the underneath middle layer (B layer) 13, an error can be produced in the value of the measured thickness. By contrast, the case of the control using the deposition amount can carry out more exact quality control, not influenced by the formation situation of the alloy layer. When the deposition amount is smaller than 4 μg/cm², the solder wettability is poor. In order to provide more sufficient solder wettability, the deposition amount is preferably 4 μg/cm² or larger. Further when the deposition amount is large, the inserting/extracting force largely increases, and in order to provide more sufficient low insertability/extractability, the deposition amount is preferably 330 μg/cm² or smaller, and more preferably 120 μg/cm² or smaller.

(Underlayer (C Layer))

Between the base material 11 and the middle layer (B layer) 13, the underlayer (C layer) 12 comprising one or two or more selected from the group consisting of Ni, Cr, Mn, Fe, Co, and Cu is preferably formed. By forming the underlayer (C layer) 12 by using one or two or more metals selected from the group consisting of Ni, Cr, Mn, Fe, Co, and Cu, the thin film lubrication effect is improved due to the formation of the hard underlayer (C layer) to thereby improve low insertability/extractability; and the underlayer (C layer) 12 prevents the diffusion of constituting metals of the base material 11 to the middle layer (B layer) to thereby improve the durability including the suppression of the increase in the contact resistance and the deterioration of the solder wettability after the heat resistance test and the gas corrosion resistance test.

The alloy composition of the underlayer (C layer) 12 comprises 50 mass % or more of the total of Ni, Cr, Mn, Fe, Co, and Cu, and may further comprise one or two or more selected from the group consisting of B, P, Sn, and Zn. By making the alloy composition of the underlayer (C layer) 12 to have such a constitution, the underlayer (C layer) is further hardened to thereby further improve the thin film lubrication effect to improve low insertability/extractability; and the alloying of the underlayer (C layer) 12 further prevents the diffusion of constituting metals of the base material 11 to the middle layer (B layer) to thereby improve the durability including the suppression of the increase in the contact resistance and the deterioration of the solder wettability after the heat resistance test and the gas corrosion resistance test.

The thickness of the underlayer (C layer) 12 is preferably 0.05 μm or larger. With the thickness of the underlayer (C layer) 12 of smaller than 0.05 μm, the thin film lubrication effect by the hard underlayer (C layer) decreases to thereby worsen the low insertability/extractability; and the constituting metals of the base material 11 become liable to diffuse to the middle layer (B layer) to thereby worsen the durability including the easy increase in the contact resistance and the easy deterioration of the solder wettability after the heat resistance test and the gas corrosion resistance test.

The deposition amount of Ni, Cr, Mn, Fe, Co, or Cu of the underlayer (C layer) 12 is preferably 0.03 mg/cm² or larger.

Here, the reason to define the deposition amount will be described. For example, in some cases of measuring the thickness of the underlayer (C layer) 12 by an X-ray fluorescent film thickness meter, due to alloy layers formed with the outermost surface layer (A layer) 14, the middle layer (B layer) 13, the base material 11 and the like, an error is produced in the value of the measured thickness. By contrast, the case of the control using the deposition amount can carry out more exact quality control, not influenced by the formation situation of the alloy layer. With the deposition amount of smaller than 0.03 mg/cm$^2$, the thin film lubrication effect by the hard underlayer (C layer) decreases to thereby worsen the low insertability/extractability; and the constituting metals of the base material 11 become liable to diffuse to the middle layer (B layer) to thereby worsen the durability including the easy increase in the contact resistance and the easy deterioration of the solder wettability after the heat resistance test and the gas corrosion resistance test.

(Heat Treatment)

After the outermost surface layer (A layer) 14 is formed, for the purpose of improving low insertability/extractability, low whisker formability and durability (heat resistance, gas corrosion resistance, solder wettability and the like), a heat treatment may be carried out. The heat treatment makes it easy for the outermost surface layer (A layer) 14 and the middle layer (B layer) 13 to form an alloy layer and makes the adhesion of Sn lower to thereby provide low insertability/extractability, and to thereby further improve the low whisker formability and the durability. Here, the treatment condition (temperature×time) of the heat treatment can suitably be selected. Here, the heat treatment may not particularly be carried out.

(Post-Treatment)

On the outermost surface layer (A layer) 14 or after the heat treatment is carried out on the outermost surface layer (A layer) 14, for the purpose of improving the low insertability/extractability and the durability (heat resistance, gas corrosion resistance, solder wettability and the like), a post-treatment may be carried out. The post-treatment improves the lubricity, provides further low insertability/extractability, and suppresses the oxidation of the outermost surface layer (A layer) and the middle layer (B layer), to thereby improve the durability such as heat resistance, gas corrosion resistance, and solder wettability. The post-treatment specifically includes a phosphate salt treatment, a lubrication treatment and a silane coupling treatment, using inhibitors. Here, the treatment condition (temperature×time) of the heat treatment can suitably be selected. Then, the heat treatment may not particularly be carried out.

<Properties of the Electronic Component Metal Material>

The surface Vickers hardness (as measured from the surface of the outermost surface layer) of the outermost surface layer (A layer) is preferably Hv90 or higher. With the surface Vickers hardness of the outermost surface layer (A layer) 14 of Hv90 or higher, the hard outermost surface layer (A layer) improves the thin film lubrication effect and improves the low insertability/extractability. By contrast, the surface Vickers hardness (as measured from the surface of the outermost surface layer) of the outermost surface layer (A layer) 14 is preferably Hv300 or lower. With the surface Vickers hardness of the outermost surface layer (A layer) 14 of Hv300 or lower, the bending workability is improved; and in the case where the electronic component metal material according to the present invention is press-formed, cracks are hardly generated in the formed portion.

The surface indentation hardness (as measured from the surface of the outermost surface layer) of the outermost surface layer (A layer) 14 is preferably 1,000 MPa or higher. With the surface indentation hardness of the outermost surface layer (A layer) 14 of 1,000 MPa or higher, the hard outermost surface layer (A layer) improves the thin film lubrication effect and improves the low insertability/extractability. By contrast, the surface indentation hardness (as measured from the surface of the outermost surface layer) of the outermost surface layer (A layer) 14 is preferably 4200 MPa or lower. With the surface indentation hardness of the outermost surface layer (A layer) 14 of 4200 MPa or lower, the bending workability is improved; and in the case where the electronic component metal material according to the present invention is press-formed, cracks are hardly generated in the formed portion, and the decrease in the gas corrosion resistance (durability) is suppressed.

The arithmetic average height (Ra) of the surface of the outermost surface layer (A layer) 14 is preferably 0.1 μm or lower. With the arithmetic average height (Ra) of the surface of the outermost surface layer (A layer) 14 of 0.1 μm or lower, since convex portions, which are relatively easily corroded, become few and the surface becomes smooth, the gas corrosion resistance is improved.

The maximum height (Rz) of the surface of the outermost surface layer (A layer) 14 is preferably 1 μm or lower. With the maximum height (Rz) of the surface of the outermost surface layer (A layer) 14 of 1 μm or lower, since convex portions, which are relatively easily corroded, become few and the surface becomes smooth, the gas corrosion resistance is improved.

The surface reflection density of the outermost surface layer (A layer) 14 is preferably 0.3 or higher. With the surface reflection density of the outermost surface layer (A layer) 14 of 0.3 or higher, the gas corrosion resistance is improved.

The Vickers hardness of the underlayer (C layer) 12 is preferably Hv300 or higher. With the Vickers hardness of the underlayer (C layer) 12 of Hv300 or higher, the underlayer (C layer) is further hardened to thereby further improve the thin film lubrication effect to improve the low insertability/extractability. By contrast, the Vickers hardness of the underlayer (C layer) 12 is preferably Hv1,000 or lower. With the Vickers hardness of the underlayer (C layer) 12 of Hv1,000 or lower, the bending workability is improved; and in the case where the electronic component metal material according to the present invention is press-formed, cracks are hardly generated in the formed portion, and the decrease in the gas corrosion resistance (durability) is suppressed.

The Vickers hardness of the underlayer (C layer) 12 and the thickness of the underlayer (C layer) 12 preferably satisfy the following expression:

$$\text{Vickers hardness } (Hv) \geq -376.22 \text{ Ln (thickness: μm)} + 86.411.$$

If the Vickers hardness of the underlayer (C layer) 12 and the thickness of the underlayer (C layer) 12 satisfy the above expression, the underlayer (C layer) is further hardened to thereby further improve the thin film lubrication effect to improve the low insertability/extractability.

Here, in the present invention, "Ln (thickness: μm)" refers to a numerical value of a natural logarithm of a thickness (μm).

The indentation hardness of the underlayer (C layer) 12 is preferably 2,500 MPa or higher. With the indentation hardness of the underlayer (C layer) 12 of 2,500 MPa or higher, the low insertability/extractability is improved. By contrast, the indentation hardness of the underlayer (C layer) 12 is preferably 10,000 MPa or lower. With the indentation hardness of the underlayer (C layer) 12 of 10,000 MPa or lower, the bending workability is improved; and in the case where the electronic component metal material according to the present invention is press-formed, cracks are hardly generated in the formed portion, and the decrease in the gas corrosion resistance (durability) is suppressed.

The indentation hardness of the underlayer (C layer) 12 and the thickness of the underlayer (C layer) 12 preferably satisfy the following expression:

$$\text{Indentation hardness (MPa)} \geq -3998.4 \ \text{Ln (thickness: } \mu\text{m)} + 1178.9.$$

If the indentation hardness of the underlayer (C layer) 12 and the thickness of the underlayer (C layer) 12 satisfy the above expression, the underlayer (C layer) is further hardened to thereby further improve the thin film lubrication effect to improve the low insertability/extractability.

When a depth analysis by XPS (X-ray photoelectron spectroscopy) is carried out, it is preferable that a position ($D_1$) where the atomic concentration (at %) of Sn or In in the outermost surface layer (A layer) 14 is a maximum value and a position ($D_2$) where the atomic concentration (at %) of Ag, Au, Pt, Pd, Ru, Rh, Os or Ir in the middle layer (B layer) 13 is a maximum value are present in the order of $D_1$ and $D_2$ from the outermost surface. If the positions are not present in the order of $D_1$ and $D_2$ from the outermost surface, there arises a risk that: a sufficient gas corrosion resistance cannot be provided; and when the electronic component metal material is subjected to a gas corrosion test using chlorine gas, sulfurous acid gas, hydrogen sulfide gas or the like, the metal material is corroded to thereby largely increase the contact resistance as compared with before the gas corrosion test.

When a depth analysis by XPS (X-ray photoelectron spectroscopy) is carried out, it is preferable that the middle layer (B layer) 13 has a maximum value of an atomic concentration (at %) of Ag, Au, Pt, Pd, Ru, Rh, Os or Ir of 10 at % or higher. In the case where the maximum value of the atomic concentration (at %) of Ag, Au, Pt, Pd, Ru, Rh, Os or Ir in the middle layer (B layer) 13 is lower than 10 at %, there arises a risk that the solder wettability becomes poor.

When a depth analysis by XPS (X-ray photoelectron spectroscopy) is carried out, it is preferable that a position ($D_1$) where the atomic concentration (at %) of Sn or In in the outermost surface layer (A layer) 14 is a maximum value, a position ($D_2$) where the atomic concentration (at %) of Ag, Au, Pt, Pd, Ru, Rh, Os or Ir in the middle layer (B layer) 13 is a maximum value and a position ($D_3$) where the atomic concentration (at %) of Ni, Cr, Mn, Fe, Co or Cu of the underlayer (C layer) 12 is a maximum value are present in the order of $D_1$ and $D_2$ and $D_3$ from the outermost surface. If the positions are not present in the order of $D_1$, $D_2$ and $D_3$ from the outermost surface, there arises a risk that: a sufficient gas corrosion resistance cannot be provided; and when the electronic component metal material is subjected to a gas corrosion test using chlorine gas, sulfurous acid gas, hydrogen sulfide gas or the like, the metal material is corroded to thereby largely increase the contact resistance as compared with before the gas corrosion test.

When a depth analysis by XPS (X-ray photoelectron spectroscopy) is carried out, it is preferable that: the middle layer (B layer) 13 has a maximum value of an atomic concentration (at %) of Ag, Au, Pt, Pd, Ru, Rh, Os or Ir of 10 at % or higher; and a depth where the atomic concentration (at %) of Ni, Cr, Mn, Fe, Co or Cu of the underlayer (C layer) 12 is 25 at % or higher is 50 nm or more. In the case where the maximum value of the atomic concentration (at %) of Ag, Au, Pt, Pd, Ru, Rh, Os or Ir in the middle layer (B layer) 13 are lower than 10 at %; and where a depth where the atomic concentration (at %) of Ni, Cr, Mn, Fe, Co or Cu of the underlayer (C layer) 12 is 25 at % or higher is shallower than 50 nm, there arises a risk that the base material components diffuse to the outermost surface layer (A layer) 14 or the middle layer (B layer) 13 to thereby worsen the low insertability/extractability and the durability (heat resistance, gas corrosion resistance, solder wettability and the like).

When a depth analysis by XPS (X-ray photoelectron spectroscopy) is carried out, it is preferable that between a position ($D_1$) where the atomic concentration (at %) of Sn or In in the outermost surface layer (A layer) 14 exhibits a maximum value and a position ($D_3$) where the atomic concentration (at %) of Ni, Cr, Mn, Fe, Co, Cu or Zn of the underlayer (C layer) 12 exhibits a maximum value, a region having 40 at % or more of Ag, Au, Pt, Pd, Ru, Rh, Os or Ir is present in a thickness of 1 nm or larger. When the region is present in a thickness of smaller than 1 nm, for example, in the case of Ag, there arises a risk that the solder wettability becomes poor.

When an elemental analysis of the surface of the outermost surface layer (A layer) is carried out by a survey measurement by XPS (X-ray photoelectron spectroscopy), it is preferable that the content of O is lower than 50 at %. If the content of O is 50 at % or higher, there arises a risk of raising the contact resistance.

Figure 2:
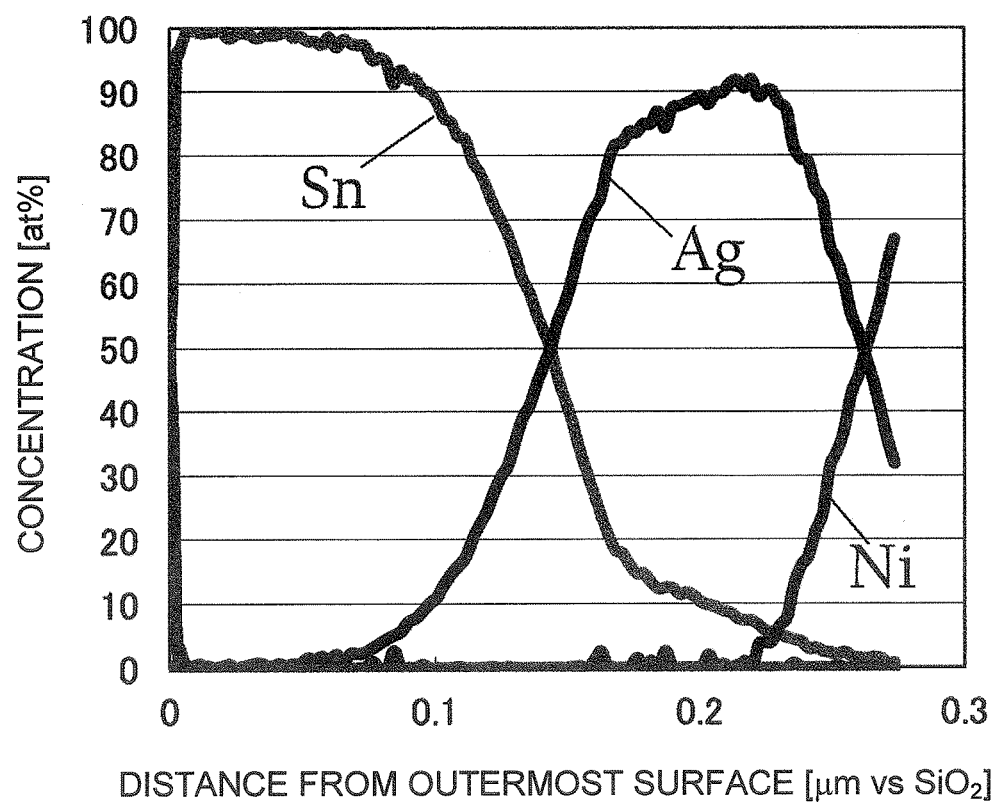
FIG. 2 is a Reference Example of a depth measurement result by XPS (X-ray photoelectron spectroscopy) of an electronic component metal material according to an embodiment of the present invention.

FIG. 2 shows a Reference Example of a depth measurement result by XPS (X-ray photoelectron spectroscopy) of an electronic component metal material using Sn of about 0.3 μm in thickness as the outermost surface layer (A layer), Ag of about 0.2 μm in thickness as the middle layer (B layer) and Ni of about 1.0 μm in thickness as the underlayer (C layer), according to an embodiment of the present invention.

<Applications of the Electronic Component Metal Material>

The applications of the electronic component metal material according to the present invention are not especially limited, but examples thereof include connector terminals using the electronic component metal material for contact portions, FFC terminals or FPC terminals using the electronic component metal material for contact portions, and electronic components using the electronic component metal material for electrodes for external connection. Here, the terminals are not limited by methods of being joined with the wiring side, including solderless terminals, soldering terminals and press-fit terminals. The electrodes for external connection include connection components in which tabs are surface-treated, and materials which are surface-treated for underbump metals of semiconductors.

Further, connectors may be fabricated by using the connector terminals thus formed; and FFCs or FPCs may be fabricated by using the FFC terminals or the FPC terminals.

Both of a male terminal and a female terminal of the connector may be of the electronic component metal material according to the present invention, and only one of a male terminal and a female terminal thereof may be of the metal material. By using the electronic component metal material according to the present invention for both of the male terminal and the female terminal, the low insertability/extractability is further improved.

<A Method for Manufacturing the Electronic Component Metal Material>

A method for manufacturing the electronic component metal material according to the present invention uses wet (electro-, electroless) plating, dry (sputtering, ion plating or the like) plating, or the like.

However, the wet plating more suppresses the generation in a plating film of whiskers due to codeposition of infinitesimal amounts of impurity components present in a plating liquid, and more improves the low insertability/extractability due to the electrodeposition texture becoming hard, than the dry plating in some cases. The wet plating is preferable from the viewpoint of the manufacture cost.

In the wet plating, electroplating is preferable. The electroplating, since forming a more uniform film than electroless plating, improves the durability (heat resistance, gas corrosion resistance, solder wettability and the like) in some cases.

The outermost surface layer (A layer) 14 is preferably formed by a plating treatment using an acidic plating liquid. The use of an acidic plating liquid improves the adherence with the middle layer (B layer) 13.

The middle layer (B layer) 13 is preferably formed by a plating treatment using a cyanide-containing plating liquid. The use of a cyanide-containing plating liquid forms a dense film, and improves the durability (heat resistance, gas corrosion resistance, solder wettability and the like).

The underlayer (C layer) 12 is preferably formed by a plating treatment using a sulfamic acid bath or a Watts bath. The use of a sulfamic acid bath or a Watts bath improves the adherence with the base material.

A plating liquid used in a sulfamic acid bath or a Watts bath is preferably a bright Ni plating liquid. The use of a bright Ni plating liquid as the plating liquid makes a film smooth and hard, and improves the low insertability/extractability and the durability (heat resistance, gas corrosion resistance, solder wettability and the like).

The sulfamic acid bath or the Watts bath preferably contains saccharin as an additive. The addition of saccharin makes the film dense and hard, and the film smooth and hard to thereby improve the low insertability/extractability and the durability (heat resistance, gas corrosion resistance, solder wettability and the like).

EXAMPLES

Hereinafter, although Examples of the present invention will be described with Comparative Examples, these are provided to better understand the present invention, and are not intended to limit the present invention.

As Examples and Comparative Examples, samples to be formed by providing a base material, an underlayer (C layer), a middle layer (B layer) and an outermost surface layer (A layer) in this order, and heat-treating the resultant, were fabricated under the conditions shown in the following Tables 1 to 7, respectively. Also examples in which no underlayer (C layer) was formed were fabricated.

The fabrication condition of base materials is shown in Table 1; the fabrication condition of underlayers (C layers) is shown in Table 2; the fabrication condition of middle layers (B layers) is shown in Table 3; the fabrication condition of outermost surface layers (A layers) is shown in Table 4; and the heat-treatment condition is shown in Table 5. Further, the fabrication conditions and the heat-treatment conditions of the each layer used in each Example are shown in Table 6; and the fabrication conditions and the heat-treatment conditions of the each layer used in each Comparative Example are shown in Table 7.

TABLE 1

| No. | Shape | Thickness [mm] | Width [mm] | Component [mass %] | Classification by Quality |
|---|---|---|---|---|---|
| 1 | Plate material | 0.30 | 30 | Cu—30Zn | ¼H |
|   | Male material | 0.64 | 2.3 | | |
| 2 | Plate material | 0.30 | 30 | Cu—30Zn | H |
|   | Male material | 0.64 | 2.3 | | |
| 3 | Plate material | 0.30 | 30 | Cu—10Sn—0.15P | EH |
|   | Male material | 0.64 | 2.3 | | |
| 4 | Plate material | 0.30 | 30 | Cu—3Ti | SH |
|   | Male material | 0.64 | 2.3 | | |

TABLE 2

| No. | Surface Treatment Method | Detail |
|---|---|---|
| 1 | Electroplating | Plating liquid: Ni sulfamate plating liquid<br>Plating temperature: 55° C.<br>Current density: 0.5 to 4 A/dm$^2$ |
| 2 | Electroplating | Plating liquid: Cu sulfate plating liquid<br>Plating temperature: 30° C.<br>Current density: 2.3 A/dm$^2$ |
| 3 | Electroplating | Plating liquid: chromium sulfate liquid<br>Plating temperature: 30° C.<br>Current density: 4 A/dm$^2$ |
| 4 | Sputtering | Target: having a predetermined composition<br>Apparatus: sputtering apparatus made by Ulvac, Inc.<br>Output: DC 50 W<br>Argon pressure: 0.2 Pa |
| 5 | Electroplating | Plating liquid: Fe sulfate liquid<br>Plating temperature: 30° C.<br>Current density: 4 A/dm$^2$ |
| 6 | Electroplating | Plating liquid: Co sulfate bath<br>Plating temperature: 30° C.<br>Current density: 4 A/dm$^2$ |
| 7 | Electroplating | Plating liquid: Ni sulfamate plating liquid + saccharin<br>Plating temperature: 55° C.<br>Current density: 4 A/dm$^2$ |
| 8 | Electroplating | Plating liquid: Ni sulfamate plating liquid + saccharin + additive<br>Plating temperature: 55° C.<br>Current density: 4 A/dm$^2$ |

TABLE 3

| No. | Surface Treatment Method | Detail |
|---|---|---|
| 1 | Electroplating | Plating liquid: Ag cyanide plating liquid<br>Plating temperature: 40° C.<br>Current density: 0.2 to 4 A/dm$^2$ |
| 2 | Electroplating | Plating liquid: Au cyanide plating liquid<br>Plating temperature: 40° C.<br>Current density: 0.2 to 4 A/dm$^2$ |
| 3 | Electroplating | Plating liquid: chloroplatinic acid plating liquid<br>Plating temperature: 40° C.<br>Current density: 0.2 to 4 A/dm$^2$ |
| 4 | Electroplating | Plating liquid: diammine palladium(II) chloride plating liquid |

TABLE 3-continued

| No. | Surface Treatment Method | Detail |
|---|---|---|
|  |  | Plating temperature: 40° C. |
|  |  | Current density: 0.2 to 4 A/dm² |
| 5 | Electroplating | Plating liquid: Ru sulfate plating liquid |
|  |  | Plating temperature: 40° C. |
|  |  | Current density: 0.2 to 4 A/dm² |
| 6 | Sputtering | Target: having a predetermined composition |
|  |  | Apparatus: sputtering apparatus made by Ulvac, Inc. |
|  |  | Output: DC 50 W |
|  |  | Argon pressure: 0.2 Pa |
| 7 | Electroplating | Plating liquid: Sn methanesulfonate plating liquid |
|  |  | Plating temperature: 40° C. |
|  |  | Current density: 0.2 to 4 A/dm² |
| 8 | Electroplating | Plating liquid: Cu sulfate plating liquid |
|  |  | Plating temperature: 40° C. |
|  |  | Current density: 0.2 to 4 A/dm² |

TABLE 4

| No. | Surface Treatment Method | Detail |
|---|---|---|
| 1 | Electroplating | Plating liquid: Sn methanesulfonate plating liquid |
|  |  | Plating temperature: 40° C. |
|  |  | Current density: 0.2 to 4 A/dm² |
| 2 | Sputtering | Target: having a predetermined composition |
|  |  | Apparatus: sputtering apparatus made by Ulvac, Inc. |
|  |  | Output: DC 50 W |
|  |  | Argon pressure: 0.2 Pa |
| 3 | Electroplating | Plating liquid: Ag cyanide plating liquid |
|  |  | Plating temperature: 40° C. |
|  |  | Current density: 0.2 to 4 A/dm² |

TABLE 5

| No. | Temperature [° C.] | Time [sec] |
|---|---|---|
| 1 | 300 | 5 |
| 2 | 300 | 20 |

TABLE 6

| Example No. | A Layer Condition No. see Table 4 | B Layer Condition No. see Table 3 | C Layer Condition No. see Table 2 | Heat Treatment Condition No. see Table 5 | Base Material No. see Table 1 |
|---|---|---|---|---|---|
| 1 | 1 | 1 | — | — | 1 |
| 2 | 1 | 1 | — | — | 1 |
| 3 | 1 | 1 | — | — | 1 |
| 4 | 1 | 1 | — | — | 1 |
| 5 | 1 | 1 | — | — | 2 |
| 6 | 2 | 1 | — | — | 1 |
| 7 | 2 | 1 | — | — | 1 |
| 8 | 2 | 1 | — | — | 1 |
| 9 | 2 | 1 | — | — | 1 |
| 10 | 2 | 1 | — | — | 1 |
| 11 | 2 | 1 | — | — | 1 |
| 12 | 2 | 1 | — | — | 1 |
| 13 | 2 | 1 | — | — | 1 |
| 14 | 2 | 1 | — | — | 1 |
| 15 | 2 | 1 | — | — | 1 |
| 16 | 2 | 1 | — | — | 1 |
| 17 | 2 | 1 | — | — | 1 |
| 18 | 2 | 1 | — | — | 1 |
| 19 | 2 | 1 | — | — | 1 |
| 20 | 2 | 1 | — | — | 1 |
| 21 | 2 | 1 | — | — | 1 |
| 22 | 2 | 1 | — | — | 1 |
| 23 | 2 | 1 | — | — | 1 |
| 24 | 2 | 1 | — | — | 1 |
| 25 | 1 | 2 | — | — | 1 |
| 26 | 1 | 3 | — | — | 1 |
| 27 | 1 | 4 | — | — | 1 |
| 28 | 1 | 5 | — | — | 1 |
| 29 | 1 | 6 | — | — | 1 |
| 30 | 1 | 6 | — | — | 1 |
| 31 | 1 | 6 | — | — | 1 |
| 32 | 1 | 6 | — | — | 1 |
| 33 | 1 | 6 | — | — | 1 |
| 34 | 1 | 6 | — | — | 1 |
| 35 | 1 | 6 | — | — | 1 |
| 36 | 1 | 6 | — | — | 1 |
| 37 | 1 | 6 | — | — | 1 |
| 38 | 1 | 6 | — | — | 1 |
| 39 | 1 | 6 | — | — | 1 |
| 40 | 1 | 6 | — | — | 1 |
| 41 | 1 | 6 | — | — | 1 |
| 42 | 1 | 6 | — | — | 1 |
| 43 | 1 | 6 | — | — | 1 |
| 44 | 1 | 6 | — | — | 1 |
| 45 | 1 | 6 | — | — | 1 |

TABLE 6-continued

| Example No. | A Layer Condition No. see Table 4 | B Layer Condition No. see Table 3 | C Layer Condition No. see Table 2 | Heat Treatment Condition No. see Table 5 | Base Material No. see Table 1 |
|---|---|---|---|---|---|
| 46 | 1 | 6 | — | — | 1 |
| 47 | 1 | 6 | — | — | 1 |
| 48 | 1 | 6 | — | — | 1 |
| 49 | 1 | 6 | — | — | 1 |
| 50 | 1 | 6 | — | — | 1 |
| 51 | 1 | 6 | — | — | 1 |
| 52 | 1 | 6 | — | — | 1 |
| 53 | 1 | 6 | — | — | 1 |
| 54 | 1 | 1 | — | — | 2 |
| 55 | 1 | 1 | — | — | 3 |
| 56 | 1 | 1 | — | — | 4 |
| 57 | 1 | 1 | 1 | — | 2 |
| 62 | 1 | 1 | 4 | — | 2 |
| 63 | 1 | 1 | 3 | — | 2 |
| 64 | 1 | 1 | 4 | — | 2 |
| 65 | 1 | 1 | 5 | — | 2 |
| 66 | 1 | 1 | 6 | — | 2 |
| 67 | 1 | 1 | 2 | — | 2 |
| 68 | 1 | 1 | 4 | — | 2 |
| 69 | 1 | 1 | 4 | — | 2 |
| 70 | 1 | 1 | 4 | — | 2 |
| 71 | 1 | 1 | 4 | — | 2 |
| 72 | 1 | 1 | 4 | — | 2 |
| 73 | 1 | 1 | 1 | — | 2 |
| 74 | 1 | 1 | 1 | — | 2 |
| 75 | 1 | 1 | 1 | — | 2 |
| 76 | 1 | 1 | 1 | — | 2 |
| 77 | 1 | 1 | 1 | — | 2 |
| 78 | 1 | 1 | 1 | — | 2 |
| 79 | 1 | 1 | 1 | — | 2 |
| 80 | 1 | 1 | 1 | — | 2 |
| 81 | 1 | 1 | 1 | — | 2 |
| 82 | 1 | 1 | 1 | — | 2 |
| 83 | 1 | 1 | 7 | — | 2 |
| 84 | 1 | 1 | 8 | — | 2 |
| 85 | 1 | 1 | 7 | — | 2 |
| 86 | 1 | 1 | 7 | — | 2 |
| 87 | 1 | 1 | 8 | — | 2 |
| 88 | 1 | 1 | 8 | — | 2 |
| 89 | 1 | 1 | 4 | — | 2 |
| 90 | 1 | 1 | 4 | — | 2 |
| 91 | 1 | 1 | 1 | — | 1 |
| 92 | 1 | 1 | 1 | — | 3 |
| 93 | 1 | 1 | 1 | — | 4 |
| 94 | 1 | 1 | 1 | 1 | 2 |
| 95 | 1 | 1 | 1 | 2 | 2 |
| 96 | 2 | 1 | 1 | — | 2 |
| 97 | 1 | 6 | 1 | — | 2 |
| 98 | 1 | 1 | 4 | — | 2 |

TABLE 7

| Comparative Example No. | A Layer Condition No. see Table 4 | B Layer Condition No. see Table 3 | C Layer Condition No. see Table 2 | Heat Treatment Condition No. see Table 5 | Base Material No. see Table 1 |
|---|---|---|---|---|---|
| 1 | 1 | — | 1 | 1 | 1 |
| 2 | 1 | — | 1 | 1 | 1 |
| 3 | 1 | 8 | 1 | 1 | 1 |
| 4 | 1 | 8 | 1 | 1 | 1 |
| 5 | 1 | 8 | 1 | — | 1 |
| 6 | 1 | — | 2 | 1 | 1 |
| 7 | 1 | — | 1 | 1 | 1 |
| 8 | 1 | — | — | — | 1 |
| 9 | 1 | 1 | — | — | 1 |
| 10 | 3 | 7 | — | — | 1 |
| 11 | 2 | — | — | — | 1 |
| 12 | 3 | 7 | 1 | — | 2 |
| 13 | 2 | — | 1 | — | 2 |
| 14 | 1 | — | 1 | — | 2 |

(Measurement of a Thickness)

The thicknesses of an outermost surface layer (A layer), a middle layer (B layer) and an underlayer (C layer) were measured by carrying out the each surface treatment on a base material not having any composition of the outermost surface layer (A layer), the middle layer (B layer) and the underlayer (C layer), and measuring respective actual thicknesses by an X-ray fluorescent film thickness meter (made by Seiko Instruments Inc., SEA5100, collimator: 0.1 mmϕ). For example, in the case of an Sn plating, if the base material is a Cu-10 mass % Sn-0.15 mass % P material, since the base material has Sn and the thickness of Sn plating cannot be determined exactly, the thickness of the outermost surface layer (A layer) was measured using a base material of Cu-30 mass % Zn, which had no Sn.

(Measurement of a Deposition Amount)

Each sample was acidolyzed with sulfuric acid, nitric acid or the like, and measured for a deposition amount of each metal by ICP (inductively coupled plasma) atomic emission spectroscopy. The acid to be specifically used depended on the composition of the each sample.

(Determination of a Composition)

The composition of each metal was calculated based on the measured deposition amount.

(Determination of a Layer Structure)

The layer structure of the obtained sample was determined by a depth profile by XPS (X-ray photoelectron spectroscopy) analysis. The analyzed elements were compositions of an outermost surface layer (A layer), a middle layer (B layer) and an underlayer (C layer), and C and O. These elements were made as designated elements. With the total of the designated elements being taken to be 100%, the concentration (at %) of the each element was analyzed. The thickness by the XPS (X-ray photoelectron spectroscopy) analysis corresponds to a distance (in terms of $SiO_2$) on the abscissa of the chart by the analysis.

The surface of the obtained sample was also subjected to a qualitative analysis by a survey measurement by XPS (X-ray photoelectron spectroscopy) analysis. The resolution of the concentration by the qualitative analysis was set at 0.1 at %.

An XPS apparatus to be used was 5600MC, made by Ulvac-Phi, Inc, and the measurement was carried out under the conditions of ultimate vacuum: $5.7 \times 10^{-9}$ Torr, exciting source: monochromated AlKα, output: 210 W, detection area: 800 μmϕ, incident angle: 45°, takeoff angle: 45°, and no neutralizing gun, and under the following sputtering condition.

Ion species: $Ar^+$
Acceleration voltage: 3 kV
Sweep region: 3 mm×3 mm
Rate: 2.8 nm/min (in terms of $SiO_2$)

(Evaluations)

Each sample was evaluated for the following.

A. Inserting/Extracting Force

The inserting/extracting force was evaluated by using a commercially available Sn reflow-plated female terminal (090-type Sumitomo TS/Yazaki 09011 series female terminal, non-waterproof/F090-SMTS) and subjecting the female terminal to an insertion/extraction test with each plated male terminal of Examples and Comparative Examples.

A measurement apparatus used in the test was 1311NR, made by Aikoh Engineering Co., Ltd., and the evaluation used 5 mm as a slide distance of a male pin. The number of the samples was set to be five; and since in the inserting/extracting force, the inserting force and the extracting force were identical, an average value of maximum inserting forces of the 5 samples was employed. A blank material employed for the inserting/extracting force was samples of Comparative Example 1.

The target of the inserting/extracting force was lower than the maximum inserting/extracting force of Comparative Example 1.

As the female terminal used in the present tests, a commercially available Sn reflow plated female terminal was used, but use of platings according to Examples or an Au plating would have more reduced the inserting/extracting force.

B. Whisker

Whiskers were evaluated by a load test (ball penetrator method) according to JEITA RC-5241. That is, a load test was carried out on each sample; and the sample whose load test had been finished was observed at a magnification of 100 to 10,000 times by a SEM (made by JEOL Ltd., type: JSM-5410) to observe the generation situation of whiskers. The load test condition is shown in the below.

Diameter of the ball penetrator: ϕ1 mm±0.1 mm
Test load: 2 N±0.2 N
Test time: 120 hours
The 10 samples The target property was made to be less generation of whiskers than in a material currently used (Comparative Example 1), in which the number of whiskers of 20 μm or longer in length is 2 or less.

C. Contact Resistance

The contact resistance was measured using a contact simulator CRS-113-Au, made by Yamasaki-Seiki Co., Ltd., by a four-terminal method under the condition of a contact load of 50 g. The number of the samples was made to be five, and a range of from the minimum value to the maximum value of the samples was employed. The target property was a contact resistance of 10 mΩ or lower.

D. Heat Resistance

The heat resistance was evaluated by measuring the contact resistance of a sample after an atmospheric heating (155° C.×500 h) test. The target property was a contact resistance of 10 mΩ or lower, but the top target was made to be no variation (being equal) in the contact resistance before and after the heat resistance test.

E. Gas Corrosion Resistance

The gas corrosion resistance was evaluated by three test environments shown in the following (1) to (3). The evaluation of the gas corrosion resistance was carried out by using the contact resistance of a sample after the environment tests of (1) to (3). The target property was a contact resistance of 10 m) or lower, but the top target was made to be no variation (being equal) in the contact resistance before and after the heat resistance test.

(1) Salt Spray Test
Salt concentration: 5%
Temperature: 35° C.
Spray pressure: 98±10 kPa
Exposure time: 240 h
(2) Sulfurous Acid Gas Corrosion Test
Sulfurous acid concentration: 25 ppm
Temperature: 40° C.
Humidity: 80% RH
Exposure time: 240 h
(3) Hydrogen Sulfide Gas Corrosion Test
Sulfurous acid concentration: 3 ppm
Temperature: 40° C.

Humidity: 80% RH
Exposure time: 240 h

F. Solder Wettability

The solder wettability was evaluated using samples after the plating and after the pressure cooker test (105° C.×unsaturated 100% RH×96 hours). The solder wetting time was measured using a Solder Checker (made by Rhesca Corp., SAT-5000) and using a commercially available 25% rosin ethanol flux as a flux by a meniscography. The solder to be used was Sn-3Ag-0.5Cu (250° C.). The number of the samples was made to be five, and a range of from the minimum value to the maximum value of the samples was employed. The target property was 5 sec or less in terms of zero cross time.

G. Bending Workability

The bending workability was evaluated using a ratio of a minimum bending radius (MBR) at which the metal material generated no cracks when being subjected to a W bending test according to the Japan Copper and Brass Association Technical Standard (JCBA) T307 to a thickness (t) of the metal material, and when the minimum bending radius ratio (MBR/t) is 3 or lower, the bending workability was evaluated as good. The evaluation was made as "circle" in the case where no crack was observed in the plating film in the observation of the surface of the bending-worked portion by an optical microscope, and no practical problem was judged to be caused; and as "X-mark" in the case where any cracks were observed therein. Here, the number of the samples was made to be 3.

H. Vickers Hardness

The Vickers hardness of the outermost surface layer (A layer) was measured by making an impression from the sample surface by a load of 980.7 mN for a load holding time of 15 sec. Here, the measurement was carried out five times per one sample.

The Vickers hardness of an underlayer (C layer) was measured by making an impression from the underlayer (C layer) cross-section by a load of 980.7 mN for a load holding time of 15 sec.

I. Indentation Hardness

The indentation hardness of the outermost surface layer (A layer) and the metal base material was measured by making an impression from the surface of the sample by a load of 980.7 mN for a load holding time of 15 sec. Here, the measurement was carried out five times per one sample.

The indentation hardness of an underlayer (C layer) was measured by making an impression from the underlayer (C layer) cross-section by a load of 980.7 mN for a load holding time of 15 sec.

J. Surface Roughness

The surface roughnesses (arithmetic average height (Ra) and maximum height (Rz)) were measured according to JIS B 0601 by using a non-contact type three dimensional measurement instrument (made by Mitaka Kohki Co., Ltd., type: NH-3). The measurement was carried out five times per one sample, with a cutoff of 0.25 mm and a measurement length of 1.50 mm.

K. Reflection Density

The reflection density was measured as a reflectance by using a densitometer (ND-1, made by Nippon Denshoku Industries Co., Ltd.). Here, the measurement was carried out five times per one sample.

L. Elongation

The elongation was measured by carrying out a tensile test in the rolling-parallel direction of each sample according to JIS C 6511. The tension rate was set at 50 mm/min. Here, the number of the samples was made to be 3.

M. Minimum Bending Radius Ratio (MBR/t)

The minimum bending radius ratio was measured as a ratio of (a minimum bending radius at which the material of a test piece generated no cracks)/(a thickness of the test piece) by the same method as in the bending workability. Here, the number of the samples was made to be 5.

For the above tests, the evaluation results under the each condition are shown in Tables 8 to 22.

TABLE 8

| | | Outermost Surface Layer (A layer) | | | Middle Layer (B layer) | | | Underlayer (C layer) | | | | |
|---|---|---|---|---|---|---|---|---|---|---|---|---|
| | | Composition | Thickness [µm] | Deposition Amount [µg/cm²] | Composition | Thickness [µm] | Deposition Amount [µg/cm²] | Composition | Thickness [µm] | Deposition Amount [mg/cm²] | Heat Treatment Condition | Base Material Composition |
| Example | 1 | Sn | 0.600 | 436.8 | Ag | 0.300 | 315.0 | | | | none | Cu—30Zn (¼H) |
| | 2 | Sn | 0.300 | 218.4 | Ag | 0.030 | 31.5 | | | | none | Cu—30Zn (¼H) |
| | 3 | Sn | 0.300 | 218.4 | Ag | 0.300 | 315.0 | | | | none | Cu—30Zn (¼H) |
| | 4 | Sn | 0.300 | 218.4 | Ag | 0.001 | 1.1 | | | | none | Cu—30Zn (¼H) |
| | 5 | Sn | 0.300 | 218.4 | Ag | 0.030 | 31.5 | | | | none | Cu—30Zn (H) |
| | 6 | Sn | 0.300 | 218.4 | Ag | 0.030 | 31.5 | | | | none | Cu—30Zn (¼H) |
| | 7 | In | 0.300 | 218.4 | Ag | 0.030 | 31.5 | | | | none | Cu—30Zn (¼H) |
| | 8 | Sn—2Ag | 0.300 | 218.4 | Ag | 0.030 | 31.5 | | | | none | Cu—30Zn (¼H) |
| | 9 | Sn—2As | 0.300 | 218.4 | Ag | 0.030 | 31.5 | | | | none | Cu—30Zn (¼H) |
| | 10 | Sn—2Au | 0.300 | 218.4 | Ag | 0.030 | 31.5 | | | | none | Cu—30Zn (¼H) |
| | 11 | Sn—2Bi | 0.300 | 218.4 | Ag | 0.030 | 31.5 | | | | none | Cu—30Zn (¼H) |
| | 12 | Sn—2Cd | 0.300 | 218.4 | Ag | 0.030 | 31.5 | | | | none | Cu—30Zn (¼H) |
| | 13 | Sn—2Co | 0.300 | 218.4 | Ag | 0.030 | 31.5 | | | | none | Cu—30Zn (¼H) |
| | 14 | Sn—2Cr | 0.300 | 218.4 | Ag | 0.030 | 31.5 | | | | none | Cu—30Zn (¼H) |
| | 15 | Sn—2Cu | 0.300 | 218.4 | Ag | 0.030 | 31.5 | | | | none | Cu—30Zn (¼H) |
| | 16 | Sn—2Fe | 0.300 | 218.4 | Ag | 0.030 | 31.5 | | | | none | Cu—30Zn (¼H) |
| | 17 | Sn—2In | 0.300 | 218.4 | Ag | 0.030 | 31.5 | | | | none | Cu—30Zn (¼H) |
| | 18 | Sn—2Mn | 0.300 | 218.4 | Ag | 0.030 | 31.5 | | | | none | Cu—30Zn (¼H) |
| | 19 | Sn—2Mo | 0.300 | 218.4 | Ag | 0.030 | 31.5 | | | | none | Cu—30Zn (¼H) |
| | 20 | Sn—2Ni | 0.300 | 218.4 | Ag | 0.030 | 31.5 | | | | none | Cu—30Zn (¼H) |
| | 21 | Sn—2Pb | 0.300 | 218.4 | Ag | 0.030 | 31.5 | | | | none | Cu—30Zn (¼H) |
| | 22 | Sn—2Sb | 0.300 | 218.4 | Ag | 0.030 | 31.5 | | | | none | Cu—30Zn (¼H) |
| | 23 | Sn—2W | 0.300 | 218.4 | Ag | 0.030 | 31.5 | | | | none | Cu—30Zn (¼H) |
| | 24 | Sn—2Zn | 0.300 | 218.4 | Ag | 0.030 | 31.5 | | | | none | Cu—30Zn (¼H) |

TABLE 8-continued

|  | | Outermost Surface Layer (A layer) | | | Middle Layer (B layer) | | | Underlayer (C layer) | | | |
|---|---|---|---|---|---|---|---|---|---|---|---|
|  |  | Composition | Thickness [μm] | Deposition Amount [μg/cm²] | Composition | Thickness [μm] | Deposition Amount [μg/cm²] | Composition | Thickness [μm] | Deposition Amount [mg/cm²] | Heat Treatment Condition | Base Material Composition |
|  | 25 | Sn | 0.300 | 218.4 | Au | 0.030 | 31.5 |  |  |  | none | Cu—30Zn (¼H) |
|  | 26 | Sn | 0.300 | 218.4 | Pt | 0.030 | 31.5 |  |  |  | none | Cu—30Zn (¼H) |
|  | 27 | Sn | 0.300 | 218.4 | Pd | 0.030 | 31.5 |  |  |  | none | Cu—30Zn (¼H) |
|  | 28 | Sn | 0.300 | 218.4 | Ru | 0.030 | 31.5 |  |  |  | none | Cu—30Zn (¼H) |
|  | 29 | Sn | 0.300 | 218.4 | Rh | 0.030 | 31.5 |  |  |  | none | Cu—30Zn (¼H) |
|  | 30 | Sn | 0.300 | 218.4 | Os | 0.030 | 31.5 |  |  |  | none | Cu—30Zn (¼H) |
|  | 31 | Sn | 0.300 | 218.4 | Ir | 0.030 | 31.5 |  |  |  | none | Cu—30Zn (¼H) |
|  | 32 | Sn | 0.300 | 218.4 | Ag—2Au | 0.030 | 31.5 |  |  |  | none | Cu—30Zn (¼H) |
|  | 33 | Sn | 0.300 | 218.4 | Ag—2Bi | 0.030 | 31.5 |  |  |  | none | Cu—30Zn (¼H) |
|  | 34 | Sn | 0.300 | 218.4 | Ag—2Cd | 0.030 | 31.5 |  |  |  | none | Cu—30Zn (¼H) |
|  | 35 | Sn | 0.300 | 218.4 | Ag—2Co | 0.030 | 31.5 |  |  |  | none | Cu—30Zn (¼H) |
|  | 36 | Sn | 0.300 | 218.4 | Ag—2Cu | 0.030 | 31.5 |  |  |  | none | Cu—30Zn (¼H) |
|  | 37 | Sn | 0.300 | 218.4 | Ag—2Fe | 0.030 | 31.5 |  |  |  | none | Cu—30Zn (¼H) |
|  | 38 | Sn | 0.300 | 218.4 | Ag—2In | 0.030 | 31.5 |  |  |  | none | Cu—30Zn (¼H) |
|  | 39 | Sn | 0.300 | 218.4 | Ag—2Ir | 0.030 | 31.5 |  |  |  | none | Cu—30Zn (¼H) |
|  | 40 | Sn | 0.300 | 218.4 | Ag—2Mn | 0.030 | 31.5 |  |  |  | none | Cu—30Zn (¼H) |
| Target |  |  | 0.2< | 150< |  | 0.001≤ | 1≤ |  |  |  |  |  |

TABLE 9

|  |  | Whisker | | | Gas Corrosion Resistance | | | | Solder Wetting | | |
|---|---|---|---|---|---|---|---|---|---|---|---|
|  |  | Number of Whiskers of Shorter than 20 μm in Length [number] | Number of Whiskers of 20 μm or Longer in Length [number] | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] | Comprehensive Judgment |
| Example | 1 | 3-7 | ≤1 | 1-3 | 2-4 | 1-4 | 1-4 | 1-4 | 1-3 | 2-5 | ○ |
|  | 2 | 1-5 | 0 | 1-3 | 2-4 | 2-4 | 2-4 | 2-4 | 1-3 | 2-5 | ○ |
|  | 3 | 1-5 | 0 | 1-3 | 2-4 | 2-4 | 2-4 | 2-4 | 1-3 | 2-5 | ○ |
|  | 4 | 1-5 | 0 | 1-3 | 6-9 | 2-4 | 2-4 | 2-4 | 2-5 | 4-5 | ○ |
|  | 5 | 1-5 | 0 | 1-3 | 2-4 | 2-4 | 2-4 | 2-4 | 1-3 | 2-5 | ○ |
|  | 6 | 1-5 | 0 | 1-3 | 2-4 | 2-4 | 2-4 | 2-4 | 1-3 | 2-5 | ○ |
|  | 7 | 1-5 | 0 | 1-3 | 2-4 | 2-4 | 2-4 | 2-4 | 1-3 | 2-5 | ○ |
|  | 8 | 1-5 | 0 | 1-3 | 2-4 | 2-4 | 2-4 | 2-4 | 1-3 | 2-5 | ○ |
|  | 9 | 1-5 | 0 | 1-3 | 2-4 | 2-4 | 2-4 | 2-4 | 1-3 | 2-5 | ○ |
|  | 10 | 1-5 | 0 | 1-3 | 2-4 | 2-4 | 2-4 | 2-4 | 1-3 | 2-5 | ○ |
|  | 11 | 1-5 | 0 | 1-3 | 2-4 | 2-4 | 2-4 | 2-4 | 1-3 | 2-5 | ○ |
|  | 12 | 1-5 | 0 | 1-3 | 2-4 | 2-4 | 2-4 | 2-4 | 1-3 | 2-5 | ○ |
|  | 13 | 1-5 | 0 | 1-3 | 2-4 | 2-4 | 2-4 | 2-4 | 1-3 | 2-5 | ○ |
|  | 14 | 1-5 | 0 | 1-3 | 2-4 | 2-4 | 2-4 | 2-4 | 1-3 | 2-5 | ○ |
|  | 15 | 1-5 | 0 | 1-3 | 2-4 | 2-4 | 2-4 | 2-4 | 1-3 | 2-5 | ○ |
|  | 16 | 1-5 | 0 | 1-3 | 2-4 | 2-4 | 2-4 | 2-4 | 1-3 | 2-5 | ○ |
|  | 17 | 1-5 | 0 | 1-3 | 2-4 | 2-4 | 2-4 | 2-4 | 1-3 | 2-5 | ○ |
|  | 18 | 1-5 | 0 | 1-3 | 2-4 | 2-4 | 2-4 | 2-4 | 1-3 | 2-5 | ○ |
|  | 19 | 1-5 | 0 | 1-3 | 2-4 | 2-4 | 2-4 | 2-4 | 1-3 | 2-5 | ○ |
|  | 20 | 1-5 | 0 | 1-3 | 2-4 | 2-4 | 2-4 | 2-4 | 1-3 | 2-5 | ○ |
|  | 21 | 1-5 | 0 | 1-3 | 2-4 | 2-4 | 2-4 | 2-4 | 1-3 | 2-5 | ○ |
|  | 22 | 1-5 | 0 | 1-3 | 2-4 | 2-4 | 2-4 | 2-4 | 1-3 | 2-5 | ○ |
|  | 23 | 1-5 | 0 | 1-3 | 2-4 | 2-4 | 2-4 | 2-4 | 1-3 | 2-5 | ○ |
|  | 24 | 1-5 | 0 | 1-3 | 2-4 | 2-4 | 2-4 | 2-4 | 1-3 | 2-5 | ○ |
|  | 25 | 1-5 | 0 | 1-3 | 2-4 | 2-4 | 2-4 | 2-4 | 1-3 | 2-5 | ○ |
|  | 26 | 1-5 | 0 | 1-3 | 2-4 | 2-4 | 2-4 | 2-4 | 1-3 | 2-5 | ○ |
|  | 27 | 1-5 | 0 | 1-3 | 2-4 | 2-4 | 2-4 | 2-4 | 1-3 | 2-5 | ○ |
|  | 28 | 1-5 | 0 | 1-3 | 2-4 | 2-4 | 2-4 | 2-4 | 1-3 | 2-5 | ○ |
|  | 29 | 1-5 | 0 | 1-3 | 2-4 | 2-4 | 2-4 | 2-4 | 1-3 | 2-5 | ○ |
|  | 30 | 1-5 | 0 | 1-3 | 2-4 | 2-4 | 2-4 | 2-4 | 1-3 | 2-5 | ○ |
|  | 31 | 1-5 | 0 | 1-3 | 2-4 | 2-4 | 2-4 | 2-4 | 1-3 | 2-5 | ○ |
|  | 32 | 1-5 | 0 | 1-3 | 2-4 | 2-4 | 2-4 | 2-4 | 1-3 | 2-5 | ○ |
|  | 33 | 1-5 | 0 | 1-3 | 2-4 | 2-4 | 2-4 | 2-4 | 1-3 | 2-5 | ○ |
|  | 34 | 1-5 | 0 | 1-3 | 2-4 | 2-4 | 2-4 | 2-4 | 1-3 | 2-5 | ○ |
|  | 35 | 1-5 | 0 | 1-3 | 2-4 | 2-4 | 2-4 | 2-4 | 1-3 | 2-5 | ○ |
|  | 36 | 1-5 | 0 | 1-3 | 2-4 | 2-4 | 2-4 | 2-4 | 1-3 | 2-5 | ○ |

TABLE 9-continued

| | | Whisker | | | | Gas Corrosion Resistance | | | Solder Wetting | | |
|---|---|---|---|---|---|---|---|---|---|---|---|
| | | Number of Whiskers of Shorter than 20 μm in Length [number] | Number of Whiskers of 20 μm or Longer in Length [number] | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] | Comprehensive Judgment |
| | 37 | 1-5 | 0 | 1-3 | 2-4 | 2-4 | 2-4 | 2-4 | 1-3 | 2-5 | ○ |
| | 38 | 1-5 | 0 | 1-3 | 2-4 | 2-4 | 2-4 | 2-4 | 1-3 | 2-5 | ○ |
| | 39 | 1-5 | 0 | 1-3 | 2-4 | 2-4 | 2-4 | 2-4 | 1-3 | 2-5 | ○ |
| | 40 | 1-5 | 0 | 1-3 | 2-4 | 2-4 | 2-4 | 2-4 | 1-3 | 2-5 | ○ |
| Target | | | ≤2 | ≤10 | ≤10 | ≤10 | ≤10 | ≤10 | ≤5 | ≤5 | |

TABLE 10

| | | Outermost Surface Layer (A layer) | | | Middle Layer (B layer) | | | Underlayer (C layer) | | | | |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | Heat Treatment Condition | Base Material Composition |
| Example | 41 | Sn | 0.300 | 218.4 | Ag—2Mo | 0.030 | 31.5 | | | | none | Cu—30Zn (¼H) |
| | 42 | Sn | 0.300 | 218.4 | Ag—2Ni | 0.030 | 31.5 | | | | none | Cu—30Zn (¼H) |
| | 43 | Sn | 0.300 | 218.4 | Ag—2Pb | 0.030 | 31.5 | | | | none | Cu—30Zn (¼H) |
| | 44 | Sn | 0.300 | 218.4 | Ag—2Pd | 0.030 | 31.5 | | | | none | Cu—30Zn (¼H) |
| | 45 | Sn | 0.300 | 218.4 | Ag—2Pt | 0.030 | 31.5 | | | | none | Cu—30Zn (¼H) |
| | 46 | Sn | 0.300 | 218.4 | Ag—2Rh | 0.030 | 31.5 | | | | none | Cu—30Zn (¼H) |
| | 47 | Sn | 0.300 | 218.4 | Ag—2Ru | 0.030 | 31.5 | | | | none | Cu—30Zn (¼H) |
| | 48 | Sn | 0.300 | 218.4 | Ag—2Sb | 0.030 | 31.5 | | | | none | Cu—30Zn (¼H) |
| | 49 | Sn | 0.300 | 218.4 | Ag—2Se | 0.030 | 31.5 | | | | none | Cu—30Zn (¼H) |
| | 50 | Sn | 0.300 | 218.4 | Ag—2Sn | 0.030 | 31.5 | | | | none | Cu—30Zn (¼H) |
| | 51 | Sn | 0.300 | 218.4 | Ag—2W | 0.030 | 31.5 | | | | none | Cu—30Zn (¼H) |
| | 52 | Sn | 0.300 | 218.4 | Ag—2Tl | 0.030 | 31.5 | | | | none | Cu—30Zn (¼H) |
| | 53 | Sn | 0.300 | 218.4 | Ag—2Zn | 0.030 | 31.5 | | | | none | Cu—30Zn (¼H) |
| Comparative Example | 1 | Sn | 1.000 | 728.0 | | | | Ni | 0.5 | 0.4 | 300° C. × 5 sec | Cu—30Zn (¼H) |
| | 2 | Sn | 0.600 | 436.8 | | | | Ni | 0.5 | 0.4 | 300° C. × 5 sec | Cu—30Zn (¼H) |
| | 3 | Sn | 0.600 | 436.8 | Cu | 0.3 | | Ni | 0.5 | 0.4 | 300° C. × 5 sec | Cu—30Zn (¼H) |
| | 4 | Sn | 0.600 | 436.8 | Cu | 0.030 | | Ni | 0.5 | 0.4 | 300° C. × 5 sec | Cu—30Zn (¼H) |
| | 5 | Sn | 0.600 | 436.8 | Cu | 0.030 | | Ni | 0.5 | 0.4 | none | Cu—30Zn (¼H) |
| | 6 | Sn | 1.000 | 728.0 | | | | Cu | 0.5 | 0.4 | 300° C. × 5 sec | Cu—30Zn (¼H) |
| | 7 | Sn | 1.000 | 728.0 | | | | Ni | 1.0 | 0.9 | 300° C. × 5 sec | Cu—30Zn (¼H) |
| | 8 | Sn | 0.300 | 218.4 | Ag | | | | | | none | Cu—30Zn (¼H) |
| | 9 | Sn | 0.150 | 109.2 | Ag | 0.030 | 31.5 | | | | none | Cu—30Zn (¼H) |
| | 10 | Ag | 0.030 | 31.5 | Sn | 0.300 | 218.4 | | | | none | Cu—30Zn (¼H) |
| | 11 | Sn—50Ag | 0.300 | 266.7 | | | | | | | none | Cu—30Zn (¼H) |
| Target | | | 0.2< | 150< | | 0.001≤ | 1≤ | | | | | |

TABLE 11

| | | Whisker | | | Gas Corrosion Resistance | | | | Solder Wetting | | |
|---|---|---|---|---|---|---|---|---|---|---|---|
| | | Number of Whiskers of Shorter than 20 μm in Length [number] | Number of Whiskers of 20 μm or Longer in Length [number] | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] | Comprehensive Judgment |
| Example | 41 | 1-5 | 0 | 1-3 | 2-4 | 2-4 | 2-4 | 2-4 | 1-3 | 2-5 | ○ |
| | 42 | 1-5 | 0 | 1-3 | 2-4 | 2-4 | 2-4 | 2-4 | 1-3 | 2-5 | ○ |
| | 43 | 1-5 | 0 | 1-3 | 2-4 | 2-4 | 2-4 | 2-4 | 1-3 | 2-5 | ○ |
| | 44 | 1-5 | 0 | 1-3 | 2-4 | 2-4 | 2-4 | 2-4 | 1-3 | 2-5 | ○ |
| | 45 | 1-5 | 0 | 1-3 | 2-4 | 2-4 | 2-4 | 2-4 | 1-3 | 2-5 | ○ |
| | 46 | 1-5 | 0 | 1-3 | 2-4 | 2-4 | 2-4 | 2-4 | 1-3 | 2-5 | ○ |
| | 47 | 1-5 | 0 | 1-3 | 2-4 | 2-4 | 2-4 | 2-4 | 1-3 | 2-5 | ○ |
| | 48 | 1-5 | 0 | 1-3 | 2-4 | 2-4 | 2-4 | 2-4 | 1-3 | 2-5 | ○ |
| | 49 | 1-5 | 0 | 1-3 | 2-4 | 2-4 | 2-4 | 2-4 | 1-3 | 2-5 | ○ |
| | 50 | 1-5 | 0 | 1-3 | 2-4 | 2-4 | 2-4 | 2-4 | 1-3 | 2-5 | ○ |
| | 51 | 1-5 | 0 | 1-3 | 2-4 | 2-4 | 2-4 | 2-4 | 1-3 | 2-5 | ○ |
| | 52 | 1-5 | 0 | 1-3 | 2-4 | 2-4 | 2-4 | 2-4 | 1-3 | 2-5 | ○ |
| | 53 | 1-5 | 0 | 1-3 | 2-4 | 2-4 | 2-4 | 2-4 | 1-3 | 2-5 | ○ |
| Comparative Example | 1 | — | ≤3 | 1-3 | | | | | 1-3 | 5< | x |
| | 2 | | | 1-3 | | | | | 5< | | x |
| | 3 | 3-7 | ≤1 | 1-3 | | | | | 1-3 | 5< | x |
| | 4 | | | 1-3 | | | | | 5< | | x |
| | 5 | | | 1-3 | | | | | 5< | | x |
| | 6 | — | ≤3 | 1-3 | | | | | 1-3 | 5< | x |
| | 7 | — | ≤3 | 1-3 | | | | | 1-3 | 5< | x |
| | 8 | | | 1-3 | | | | | 5< | | x |
| | 9 | | | 1-3 | | | | 10< | 1-3 | | x |
| | 10 | | | 1-3 | | | | 10< | 1-3 | | x |
| | 11 | | | 1-3 | | | | 10< | 1-3 | | x |
| Target | | ≤2 | ≤10 | ≤10 | ≤10 | ≤10 | ≤10 | ≤5 | ≤5 | | |

TABLE 12

| | | Outermost Surface Layer (A layer) | | | Middle Layer (B layer) | | | Underlayer (C layer) | | | Base | |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [μg/cm²] | Heat Treatment Condition | Material Composition |
| Example | 5 | Sn | 0.3 (Dk = 4) | 218.4 | Ag | 0.03 (Dk = 4) | 315.0 | | | | none | Cu—30Zn(H) |
| | 54 | Sn | 0.3 (Dk = 4) | 218.4 | Ag | 0.03 (Dk = 0.5) | 315 | | | | none | Cu—30Zn(H) |
| | 55 | Sn | 0.3 (Dk = 0.5) | 218.4 | Ag | 0.03 (Dk = 4) | 315 | | | | none | Cu—30Zn(H) |
| | 56 | Sn | 0.3 (Dk = 0.5) | 218.4 | Ag | 0.03 (Dk = 0.5) | 315 | | | | none | Cu—30Zn(H) |
| Target | | | 0.2< | 150< | | 0.001≤ | 1≤ | | | | | |

| | | Evaluation from Outermost Surface Layer | | | | Gas Corrosion Resistance | | | | Solder Wetting | |
|---|---|---|---|---|---|---|---|---|---|---|---|
| | | Arithmetic Average Height Ra [μm] | Maximum Height Rz [μm] | Reflection Density | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] |
| Example | 5 | 0.12 | 1.25 | 0.2 | 1-3 | 2-4 | 2-4 | 2-4 | 2-4 | 1-3 | 2-5 |
| | 54 | 0.087 | 0.75 | 0.3 | 1-3 | 2-4 | 1-3 | 1-3 | 1-3 | 1-3 | 2-4 |
| | 55 | 0.075 | 0.55 | 0.7 | 1-3 | 2-4 | 1-3 | 1-3 | 1-3 | 1-3 | 2-4 |
| | 56 | 0.045 | 0.35 | 0.9 | 1-3 | 2-4 | 1-3 | 1-3 | 1-3 | 1-3 | 2-4 |
| Target | | | | | ≤10 | ≤10 | ≤10 | ≤10 | ≤10 | ≤5 | ≤5 |

TABLE 13

| | | Outermost Surface Layer (A layer) | | | Middle Layer (B layer) | | | Underlayer (C layer) | | | Heat Treatment Condition | Base Material Composition |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | | |
| Example | 2 | Sn | 0.300 | 218.4 | Ag | 0.030 | 31.5 | | | | none | Cu—30Zn (¼H) |
| | 4 | Sn | 0.300 | 218.4 | Ag | 0.001 | 1.1 | | | | none | Cu—30Zn (¼H) |
| Comparative Example | 8 | Sn | 0.300 | 218.4 | Ag | | | | | | none | Cu—30Zn (¼H) |
| | 10 | Ag | 0.030 | 31.5 | Sn | 0.300 | 218.4 | | | | none | Cu—30Zn (¼H) |
| | 11 | Sn—50Ag | 0.300 | 266.7 | | | | | | | none | Cu—30Zn (¼H) |
| Target | | | 0.2< | 150< | | 0.001≤ | 1≤ | | | | | |

| | | XPS (Depth) | | Contact Resistance [mΩ] | Gas Corrosion Resistance | | | | Solder Wetting | | Comprehensive Judgment |
|---|---|---|---|---|---|---|---|---|---|---|---|
| | | | | | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] | |
| | | Order of $D_1 \cdot D_2$ | $D_2$ [at %] | | | | | | | | |
| Example | 2 | $D_1 \Rightarrow D_2$ | 87 | 1-3 | 2-4 | 2-4 | 2-4 | 2-4 | 1-3 | 2-5 | ○ |
| | 4 | $D_1 \Rightarrow D_2$ | 14 | 1-3 | 2-4 | 2-4 | 2-4 | 2-4 | 1-3 | 2-5 | ○ |
| Comparative Example | 8 | $D_1$ | <10 | 1-3 | | | | | 5< | | x |
| | 10 | $D_2 \Rightarrow D_1$ | | 1-3 | | | | 10< | 1-3 | | x |
| | 11 | $D_1 \approx D_2$ | | 1-3 | | | | 10< | 1-3 | | x |
| Target | | $D_1 \Rightarrow D_2$ | 10≤ | ≤10 | ≤10 | ≤10 | ≤10 | ≤10 | ≤5 | ≤5 | |

TABLE 14

| | | Outermost Surface Layer (A layer) | | | Middle Layer (B layer) | | | Underlayer (C layer) | | | Heat Treatment Condition | Base Material Composition |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | | |
| Example | 5 | Sn | 0.300 | 218.4 | Ag | 0.030 | 31.5 | | | | none | Cu—30Zn (H) |
| | 57 | Sn | 0.300 | 218.4 | Ag | 0.030 | 31.5 | Ni | 1.0 | 0.9 | none | Cu—30Zn (H) |
| | 58 | Sn | 0.300 | 218.4 | Ag | 0.030 | 31.5 | Ni | 1.0 | 0.9 | none | Cu—30Zn (H) |
| | 59 | Sn | 0.300 | 218.4 | Ag | 0.030 | 31.5 | Cr | 1.0 | 0.9 | none | Cu—30Zn (H) |
| | 60 | Sn | 0.300 | 218.4 | Ag | 0.030 | 31.5 | Mn | 1.0 | 0.9 | none | Cu—30Zn (H) |
| | 61 | Sn | 0.300 | 218.4 | Ag | 0.030 | 31.5 | Fe | 1.0 | 0.9 | none | Cu—30Zn (H) |
| | 62 | Sn | 0.300 | 218.4 | Ag | 0.030 | 31.5 | Co | 1.0 | 0.9 | none | Cu—30Zn (H) |
| | 63 | Sn | 0.300 | 218.4 | Ag | 0.030 | 31.5 | Cu | 1.0 | 0.9 | none | Cu—30Zn (H) |
| | 64 | Sn | 0.300 | 218.4 | Ag | 0.030 | 31.5 | Ni—20Cr | 1.0 | 0.9 | none | Cu—30Zn (H) |
| | 65 | Sn | 0.300 | 218.4 | Ag | 0.030 | 31.5 | Ni—20Mn | 1.0 | 0.9 | none | Cu—30Zn (H) |
| | 66 | Sn | 0.300 | 218.4 | Ag | 0.030 | 31.5 | Ni—20Fe | 1.0 | 0.9 | none | Cu—30Zn (H) |
| | 67 | Sn | 0.300 | 218.4 | Ag | 0.030 | 31.5 | Ni—20Co | 1.0 | 0.9 | none | Cu—30Zn (H) |
| | 68 | Sn | 0.300 | 218.4 | Ag | 0.030 | 31.5 | Ni—20Cu | 1.0 | 0.9 | none | Cu—30Zn (H) |
| | 69 | Sn | 0.300 | 218.4 | Ag | 0.030 | 31.5 | Ni—5B | 1.0 | 0.9 | none | Cu—30Zn (H) |
| | 70 | Sn | 0.300 | 218.4 | Ag | 0.030 | 31.5 | Ni—5P | 1.0 | 0.9 | none | Cu—30Zn (H) |
| | 71 | Sn | 0.300 | 218.4 | Ag | 0.030 | 31.5 | Ni—20Sn | 1.0 | 0.9 | none | Cu—30Zn (H) |

TABLE 14-continued

| | | | | | | | | | | | | |
|---|---|---|---|---|---|---|---|---|---|---|---|---|
| | 72 | Sn | 0.300 | 218.4 | Ag | 0.030 | 31.5 | Ni—20Zn | 1.0 | 0.9 | none | Cu—30Zn (H) |
| Comparative Example | 1 | Sn | 1.000 | 728.0 | | | | Ni | 0.5 | 0.4 | 300° C. × 5 sec | Cu—30Zn (¼H) |
| Target | | | 0.2< | 150< | | 0.001≤ | 1≤ | | | | | |

| | | Inserting/Extracting Force | | | Gas Corrosion Resistance | | | | Solder Wetting | |
|---|---|---|---|---|---|---|---|---|---|---|
| | | | Maximum Inserting | | Heat | | Sulfurous | Hydrogen | | |
| | | Maximum Inserting Force [N] | Force/Maximum Inserting Force of Comparative Example 1 [%] | Contact Resistance [mΩ] | Resistance Contact Resistance [mΩ] | Salt Spray Contact Resistance [mΩ] | Acid Gas Contact Resistance [mΩ] | Sulfide Contact Resistance [mΩ] | Zero Cross Time (After Plating) [sec] | Zero Cross Time (After PCT Test) [sec] |
| Example | 5 | 5.34 | 89 | 1-3 | 2-4 | 2-4 | 2-4 | 2-4 | 1-3 | 2-5 |
| | 57 | 4.74 | 79 | 1-3 | 1-4 | 1-4 | 1-4 | 1-4 | 1-3 | 2-4 |
| | 58 | 4.74 | 79 | 1-3 | 1-4 | 1-4 | 1-4 | 1-4 | 1-3 | 2-4 |
| | 59 | 4.08 | 68 | 1-3 | 1-4 | 1-4 | 1-4 | 1-4 | 1-3 | 2-4 |
| | 60 | 4.92 | 82 | 1-3 | 1-4 | 1-4 | 1-4 | 1-4 | 1-3 | 2-4 |
| | 61 | 4.74 | 79 | 1-3 | 1-4 | 1-4 | 1-4 | 1-4 | 1-3 | 2-4 |
| | 62 | 4.62 | 77 | 1-3 | 1-4 | 1-4 | 1-4 | 1-4 | 1-3 | 2-4 |
| | 63 | 4.86 | 81 | 1-3 | 1-4 | 1-4 | 1-4 | 1-4 | 1-3 | 2-4 |
| | 64 | 4.38 | 73 | 1-3 | 1-4 | 1-4 | 1-4 | 1-4 | 1-3 | 2-4 |
| | 65 | 4.86 | 81 | 1-3 | 1-4 | 1-4 | 1-4 | 1-4 | 1-3 | 2-4 |
| | 66 | 4.74 | 79 | 1-3 | 1-4 | 1-4 | 1-4 | 1-4 | 1-3 | 2-4 |
| | 67 | 4.5 | 75 | 1-3 | 1-4 | 1-4 | 1-4 | 1-4 | 1-3 | 2-4 |
| | 68 | 4.74 | 79 | 1-3 | 1-4 | 1-4 | 1-4 | 1-4 | 1-3 | 2-4 |
| | 69 | 4.08 | 68 | 1-3 | 1-4 | 1-4 | 1-4 | 1-4 | 1-3 | 2-4 |
| | 70 | 4.08 | 68 | 1-3 | 1-4 | 1-4 | 1-4 | 1-4 | 1-3 | 2-4 |
| | 71 | 4.62 | 77 | 1-3 | 1-4 | 1-4 | 1-4 | 1-4 | 1-3 | 2-4 |
| | 72 | 4.74 | 79 | 1-3 | 1-4 | 1-4 | 1-4 | 1-4 | 1-3 | 2-4 |
| Comparative Example | 1 | 6 | — | 1-3 | | | | | 1-3 | 5< |
| Target | | | <100 | ≤10 | ≤10 | ≤10 | ≤10 | ≤10 | ≤5 | ≤5 |

TABLE 15

| | | Outermost Surface Layer (A layer) | | | Middle Layer (B layer) | | | Underlayer (C layer) | | |
|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] |
| Example | 5 | Sn | 0.300 | 218.4 | Ag | 0.030 | 31.5 | | | |
| | 73 | Sn | 0.300 | 218.4 | Ag | 0.030 | 31.5 | Ni | 0.03 | 0.03 |
| | 74 | Sn | 0.300 | 218.4 | Ag | 0.030 | 31.5 | Ni | 0.1 | 0.09 |
| | 57 | Sn | 0.300 | 218.4 | Ag | 0.030 | 31.5 | Ni | 1.0 | 0.9 |
| | 75 | Sn | 0.300 | 218.4 | Ag | 0.001 | 1.1 | Ni | 1 | 0.89 |
| Comparative Example | 12 | Ag | 0.030 | 31.5 | Sn | 0.300 | 218.4 | Ni | 1 | 0.89 |
| | 13 | Sn—50Ag | 0.300 | 266.7 | | | | Ni | 1 | 0.89 |
| Target | | | 0.2< | 150< | | 0.001≤ | 1≤ | | | |

| | | | | XPS (Depth) | | | Inserting/Extracting Force | |
|---|---|---|---|---|---|---|---|---|
| | | | | | | | Maximum Inserting | |
| | | Heat Treatment Condition | Base Material Composition | Order of $D_1$, $D_2$, $D_3$ | $D_2$ [at %] | $D_3$ Thickness of 25% or more [nm] | Maximum Inserting Force [N] | Force/Maximum Inserting Force of Comparative Example 1 [%] |
| Example | 5 | none | Cu—30Zn (H) | $D_1 \Rightarrow D_2$ | 87 | | 5.34 | 89 |
| | 73 | none | Cu—30Zn (H) | $D_1 \Rightarrow D_2$ $\Rightarrow D_3$ | 87 | 40 | 5.10 | 85 |
| | 74 | none | Cu—30Zn (H) | $D_1 \Rightarrow D_2$ $\Rightarrow D_3$ | 87 | 100< | 4.92 | 82 |
| | 57 | none | Cu—30Zn (H) | $D_1 \Rightarrow D_2$ $\Rightarrow D_3$ | 87 | 100< | 4.74 | 79 |
| | 75 | none | Cu—30Zn (H) | $D_1 \Rightarrow D_2$ $\Rightarrow D_3$ | 14 | 100< | 4.62 | 77 |

TABLE 15-continued

| | | | | |
|---|---|---|---|---|
| Comparative Example | 12 | none | Cu—30Zn (H) | $D_2 \Rightarrow D_1$ $\Rightarrow D_3$ |
| | 13 | none | Cu—30Zn (H) | $D_1 \approx D_2 \Rightarrow D_3$ |
| Target | | | | <100 |

| | | Heat Resistance Contact Resistance [mΩ] | Salt Spray Contact Resistance [mΩ] | Gas Corrosion Resistance Sulfurous Acid Gas Contact Resistance [mΩ] | Hydrogen Sulfide Contact Resistance [mΩ] | Solder Wetting Zero Cross Time (After Plating) [sec] | Zero Cross Time (After PCT Test) [sec] |
|---|---|---|---|---|---|---|---|
| | Contact Resistance [mΩ] | | | | | | |
| Example | 5 | 1-3 | 2-4 | 2-4 | 2-4 | 2-4 | 1-3 | 2-5 |
| | 73 | 1-3 | 2-4 | 2-4 | 2-4 | 2-4 | 1-3 | 2-5 |
| | 74 | 1-3 | 1-4 | 1-4 | 1-4 | 1-4 | 1-3 | 2-4 |
| | 57 | 1-3 | 1-4 | 1-4 | 1-4 | 1-4 | 1-3 | 2-4 |
| | 75 | 1-3 | 1-4 | 4-7 | 5-8 | 6-9 | 1-3 | 3-5 |
| Comparative Example | 12 | 1-3 | | | | 10< | 1-3 | |
| | 13 | 1-3 | | | | 10< | 1-3 | |
| Target | | ≤10 | ≤10 | ≤10 | ≤10 | ≤10 | ≤5 | ≤5 |

TABLE 16

| | | Outermost Surface Layer (A layer) | | | Middle Layer (B layer) | | | Underlayer (C layer) | | |
|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] |
| Example | 57 | Sn | 0.300 | 218.4 | Ag | 0.030 | 31.5 | Ni | 1.0 | 0.9 |
| | 76 | Sn | 0.600 | 436.8 | Ag | 0.030 | 31.5 | Ni | 1.0 | 0.89 |
| | 77 | Sn | 0.800 | 582.4 | Ag | 0.030 | 31.5 | Ni | 1.0 | 0.89 |
| Target | | | 0.2< | 150< | | 0.001≤ | 1≤ | | | |

| | | Heat Treatment Condition | Base Material Composition | Whisker Number of Whiskers of Shorter than 20 μm in Length [number] | Number of Whiskers of 20 μm or Longer in Length [number] | Inserting/Extracting Force Maximum Inserting Force [N] | Maximum Inserting Force/Maximum Inserting Force of Comparative Example 1 [%] | Contact Resistance [mΩ] |
|---|---|---|---|---|---|---|---|---|
| Example | 57 | none | Cu—30Zn (H) | 1-5 | 0 | 4.74 | 79 | 1-3 |
| | 76 | none | Cu—30Zn (H) | 3-7 | ≤1 | 5.28 | 88 | 1-3 |
| | 77 | none | Cu—30Zn (H) | 3-7 | ≤2 | 5.76 | 96 | 1-3 |
| Target | | | | | ≤2 | | <100 | ≤10 |

| | | Heat Resistance Contact Resistance [mΩ] | Salt Spray Contact Resistance [mΩ] | Gas Corrosion Resistance Sulfurous Acid Gas Contact Resistance [mΩ] | Hydrogen Sulfide Contact Resistance [mΩ] | Solder Wetting Zero Cross Time (After Plating) [sec] | Zero Cross Time (After PCT Test) [sec] |
|---|---|---|---|---|---|---|---|
| Example | 57 | 1-4 | 1-4 | 1-4 | 1-4 | 1-3 | 2-4 |
| | 76 | 1-4 | 1-3 | 1-3 | 1-3 | 1-3 | 2-4 |
| | 77 | 1-4 | 1-3 | 1-3 | 1-3 | 1-3 | 2-4 |
| Target | | ≤10 | ≤10 | ≤10 | ≤10 | ≤5 | ≤5 |

TABLE 17

| | | Outermost Surface Layer (A layer) | | | Middle Layer (B layer) | | | Underlayer (C layer) | | | Heat Treatment Condition | Base Material Composition |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | | |
| Example | 57 | Sn | 0.300 | 218.4 | Ag | 0.030 | 31.5 | Ni | 1.0 | 0.9 | none | Cu—30Zn (H) |
| | 78 | Sn | 0.300 | 218.4 | Ag | 0.001 | 1.1 | Ni | 1 | 0.89 | none | Cu—30Zn (H) |
| | 79 | Sn | 0.300 | 218.4 | Ag | 0.007 | 7.4 | Ni | 1 | 0.89 | none | Cu—30Zn (H) |
| | 80 | Sn | 0.300 | 218.4 | Ag | 0.1 | 105.0 | Ni | 1 | 0.89 | none | Cu—30Zn (H) |
| | 81 | Sn | 0.300 | 218.4 | Ag | 0.5 | 525.0 | Ni | 1 | 0.89 | none | Cu—30Zn (H) |
| | 82 | Sn | 0.300 | 218.4 | Ag | 0.8 | 840.0 | Ni | 1 | 0.89 | none | Cu—30Zn (H) |
| Target | | | 0.2< | 150< | | 0.001≤ | 1≤ | | | | | |

| | | Inserting/Extracting Force | | | Gas Corrosion Resistance | | | | Solder Wetting | |
|---|---|---|---|---|---|---|---|---|---|---|
| | | Maximum Inserting Force [N] | Maximum Inserting Force/Maximum Inserting Force of Comparative Example 1 [%] | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] |
| Example | 57 | 4.74 | 79 | 1-3 | 1-4 | 1-4 | 1-4 | 1-4 | 1-3 | 2-4 |
| | 78 | 4.50 | 75 | 1-3 | 6-9 | 1-4 | 1-4 | 1-4 | 2-5 | 4-5 |
| | 79 | 4.56 | 76 | 1-3 | 2-5 | 1-4 | 1-4 | 1-4 | 2-3 | 2-4 |
| | 80 | 4.74 | 79 | 1-3 | 1-4 | 1-4 | 1-4 | 1-4 | 1-3 | 2-4 |
| | 81 | 5.22 | 87 | 1-3 | 1-4 | 1-4 | 1-4 | 1-4 | 1-3 | 1-3 |
| | 82 | 5.70 | 95 | 1-3 | 1-3 | 1-4 | 1-4 | 1-4 | 1-3 | 1-3 |
| Target | | | <100 | ≤10 | ≤10 | ≤10 | ≤10 | ≤10 | ≤5 | ≤5 |

TABLE 18

| | | Outermost Surface Layer (A layer) | | | Middle Layer (B layer) | | | Underlayer (C layer) | | | | |
|---|---|---|---|---|---|---|---|---|---|---|---|---|
| | | | | | | | | | | | Vickers Hardness | Balance between Vickers Hardness and Expression |
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | Hv | Expression: −376.22Ln(Thickness) + 86.411 |
| Example | 57 | Sn | 0.300 | 218.4 | Ag | 0.030 | 31.5 | Ni | 1.0 | 0.89 | 130 | 86.4 ⇒ Vickers Hardness ≥ Expression |
| | 83 | Sn | 0.300 | 218.4 | Ag | 0.030 | 31.5 | Ni(semi-glossy) | 1.0 | 0.89 | 300 | 86.4 ⇒ Vickers Hardness ≥ Expression |
| | 84 | Sn | 0.300 | 218.4 | Ag | 0.030 | 31.5 | Ni(glossy) | 1.0 | 0.89 | 500 | 86.4 ⇒ Vickers Hardness ≥ Expression |
| | 70 | Sn | 0.300 | 218.4 | Ag | 0.030 | 31.5 | Ni—P | 1.0 | 0.9 | 1200 | 86.4 ⇒ Vickers Hardness ≥ Expression |
| | 85 | Sn | 0.300 | 218.4 | Ag | 0.030 | 31.5 | Ni(semi-glossy) | 0.80 | 0.71 | 300 | 170.4 ⇒ Vickers Hardness ≥ Expression |
| | 86 | Sn | 0.300 | 218.4 | Ag | 0.030 | 31.5 | Ni(semi-glossy) | 0.50 | 0.44 | 300 | 347.2 ⇒ Vickers Hardness < Expression |
| | 87 | Sn | 0.300 | 218.4 | Ag | 0.030 | 31.5 | Ni(glossy) | 0.60 | 0.53 | 500 | 278.6 ⇒ Vickers Hardness ≥ Expression |

TABLE 18-continued

| | | | | | | | | | | |
|---|---|---|---|---|---|---|---|---|---|---|
| | 88 | Sn | 0.300 | 218.4 | Ag | 0.030 | 31.5 | Ni(glossy) | 0.30 | 0.27 | 500 | 539.4 ⇒ Vickers Hardness < Expression |
| | 89 | Sn | 0.300 | 218.4 | Ag | 0.030 | 31.5 | Ni—P | 0.20 | 0.18 | 1200 | 691.9 ⇒ Vickers Hardness ≥ Expression |
| | 90 | Sn | 0.300 | 218.4 | Ag | 0.030 | 31.5 | Ni—P | 0.05 | 0.04 | 1200 | 1213.5 ⇒ Vickers Hardness < Expression |
| Target | | | 0.2< | 150< | | 0.001≤ | 1≤ | | | | |

| | | Underlayer (C layer) | | | | | Inserting/Extracting Force | |
|---|---|---|---|---|---|---|---|---|
| | | Indentation Hardness [MPa] | Balance between Indentation Hardness and Expression Expression: −3998.4Ln (Thickness) + 1178.9 | Heat Treatment Condition | Base Material Composition | | Maximum Inserting Force [N] | Maximum Inserting Force/Maximum Inserting Force of Comparative Example 1 [%] |
| Example | 57 | 1500 | 1178.9 ⇒ Indentation Hardness ≥ Expression | none | Cu—30Zn (H) | | 4.74 | 79 |
| | 83 | 3400 | 1178.9 ⇒ Indentation Hardness ≥ Expression | none | Cu—30Zn (H) | | 4.56 | 76 |
| | 84 | 5500 | 1178.9 ⇒ Indentation Hardness ≥ Expression | none | Cu—30Zn (H) | | 4.32 | 72 |
| | 70 | 13000 | 1178.9 ⇒ Indentation Hardness ≥ Expression | none | Cu—30Zn (H) | | 4.08 | 68 |
| | 85 | 3400 | 2071.1 ⇒ Indentation Hardness ≥ Expression | none | Cu—30Zn (H) | | 4.62 | 77 |
| | 86 | 3400 | 3950.4 ⇒ Indentation Hardness < Expression | none | Cu—30Zn (H) | | 4.86 | 81 |
| | 87 | 5500 | 3221.4 ⇒ Indentation Hardness ≥ Expression | none | Cu—30Zn (H) | | 4.68 | 78 |
| | 88 | 5500 | 5992.9 ⇒ Indentation Hardness < Expression | none | Cu—30Zn (H) | | 4.98 | 83 |
| | 89 | 13000 | 7614.1 ⇒ Indentation Hardness ≥ Expression | none | Cu—30Zn (H) | | 4.68 | 78 |
| | 90 | 13000 | 13157.0 ⇒ Indentation Hardness < Expression | none | Cu—30Zn (H) | | 5.10 | 85 |
| Target | | | | | | | | <100 |

TABLE 19

| | | Outermost Surface Layer (A layer) | | | Middle Layer (B layer) | | | Underlayer (C layer) | | |
|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] |
| Example | 57 | Sn | 0.300 | 218.4 | Ag | 0.030 | 31.5 | Ni | 1.0 | 0.9 |
| | 83 | Sn | 0.030 | 21.8 | Ag | 0.030 | 31.5 | Ni(semi-glossy) | 1.0 | 0.89 |

TABLE 19-continued

|  |  |  |  |  |  |  |  |  |
|---|---|---|---|---|---|---|---|---|
|  | 84 Sn | 0.030 | 21.8 | Ag | 0.030 | 31.5 | Ni(glossy) | 1.0 | 0.89 |
|  | 85 Sn | 0.300 | 218.4 | Ag | 0.030 | 31.5 | Ni—P | 1.0 | 0.9 |
| Target |  | 0.2< | 150< |  | 0.001≥ | 1≥ |  |  |  |

|  |  | Underlayer (C layer) | | | Base | |
|---|---|---|---|---|---|---|
|  |  | Vickers Hardness Hv | Indentation Hardness [MPa] | Heat Treatment Condition | Material Composition | Bending Workability |
| Example | 57 | 130 | 1500 | none | Cu—30Zn(H) | ○ |
|  | 83 | 300 | 3400 | none | Cu—30Zn(H) | ○ |
|  | 84 | 600 | 6700 | none | Cu—30Zn(H) | ○ |
|  | 85 | 1200 | 13000 | none | Cu—30Zn(H) | x |
| Target |  |  |  |  |  |  |

TABLE 20

|  |  | Outermost Surface Layer (A layer) | | | Middle Layer (B layer) | | | Underlayer (C layer) | | | |
|---|---|---|---|---|---|---|---|---|---|---|---|
|  |  | Composition | Thickness [μm] | Deposition Amount [μg/cm²] | Composition | Thickness [μm] | Deposition Amount [μg/cm²] | Composition | Thickness [μm] | Deposition Amount [mg/cm²] | Heat Treatment Condition |
| Example | 91 | Sn | 0.300 | 218.4 | Ag | 0.030 | 31.5 | Ni | 1.0 | 0.9 | none |
|  | 57 | Sn | 0.300 | 218.4 | Ag | 0.030 | 31.5 | Ni | 1.0 | 0.9 | none |
|  | 92 | Sn | 0.300 | 218.4 | Ag | 0.030 | 31.5 | Ni | 1.0 | 0.9 | none |
|  | 93 | Sn | 0.300 | 218.4 | Ag | 0.030 | 31.5 | Ni | 1.0 | 0.9 | none |
| Target |  |  | 0.2< | 150< |  | 0.001≤ | 1≤ |  |  |  |  |

|  |  | Material | | | | | Inserting/Extracting Force | | | |
|---|---|---|---|---|---|---|---|---|---|---|
|  |  | Composition | Vickers Hardness Hv | Indentation Hardness [MPa] | Elongation [%] | Bending Radius Ratio MBR/t | Minimum Inserting Force [N] | Maximum Inserting Force/Maximum Inserting Force of Comparative Example 1 [%] | Bending Workability |
| Example | 91 | Cu—30Zn(¼H) | 75 | 800 | 30 | 2 | 4.98 | 83 | ○ |
|  | 57 | Cu—30Zn(H) | 100 | 1250 | 30 | 2 | 4.74 | 79 | ○ |
|  | 92 | Cu—10Sn—0.15P(EH) | 270 | 3700 | 5 | 3 | 3.84 | 64 | ○ |
|  | 93 | Cu—3Ti(SH) | 320 | 4500 | 4 | 4 | 3.72 | 62 | x |
| Target |  |  |  |  |  |  |  | <100 |  |

TABLE 21

|  |  | Outermost Surface Layer (A layer) | | | Middle Layer (B layer) | | | Underlayer (C layer) | | | | Material |
|---|---|---|---|---|---|---|---|---|---|---|---|---|
|  |  | Composition | Thickness [μm] | Deposition Amount [μg/cm²] | Composition | Thickness [μm] | Deposition Amount [μg/cm²] | Composition | Thickness [μm] | Deposition Amount [mg/cm²] | Heat Treatment Condition | Composition |
| Example | 57 | Sn | 0.300 | 218.4 | Ag | 0.030 | 31.5 | Ni | 1.0 | 0.9 | none | Cu—30Zn (H) |
|  | 78 | Sn | 0.300 | 218.4 | Ag | 0.001 | 1.1 | Ni | 1 | 0.89 | none | Cu—30Zn (H) |
|  | 94 | Sn | 0.300 | 218.4 | Ag | 0.030 | 31.5 | Ni | 1.0 | 0.89 | 300° C. × 5 sec | Cu—30Zn (H) |
|  | 95 | Sn | 0.300 | 218.4 | Ag | 0.030 | 31.5 | Ni | 1.0 | 0.89 | 300° C. × 20 sec | Cu—30Zn (H) |
| Comparative Example | 14 | Sn | 0.300 | 218.4 |  |  |  | Ni | 1.0 | 0.89 | none | Cu—30Zn (H) |
| Target |  |  | 0.2< | 150< |  | 0.001≤ | 1≤ |  |  |  |  |  |

|  |  | XPS (Depth) Depth of Ag, Au, Pt, Pd, Ru, Rh, Os, Ir Being 40 at % or More Between D₁ and D₃ [μm] | XPS (Survey) Concentration of O of Outermost Surface [at %] | Contact Resistance [mΩ] | Gas Corrosion Resistance | | | | Solder Wetting | |
|---|---|---|---|---|---|---|---|---|---|---|
|  |  |  |  |  | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | Zero Cross Time (After Plating) [sec] | Zero Cross Time (After PCT Test) [sec] |
| Example | 57 |  |  | 1-3 | 1-4 | 1-4 | 1-4 | 1-4 | 1-3 | 2-4 |
|  | 78 | 1 | 25.1 | 1-3 | 6-9 | 1-4 | 1-4 | 1-4 | 2-5 | 4-5 |

TABLE 21-continued

|  | 94 | 30 | 38.2 | 1-3 | 1-4 | 1-4 | 1-4 | 1-4 | 1-3 | 2-4 |
|---|---|---|---|---|---|---|---|---|---|---|
|  | 95 | 30 | 57.1 | 3-5 | 3-6 | 3-5 | 3-5 | 3-5 | 3-5 | 4-5 |
| Comparative Example | 14 |  | 25.1 | 1-3 |  |  |  |  | 5< |  |
| Target |  |  |  | ≤10 | ≤10 | ≤10 | ≤10 | ≤10 | ≤5 | ≤5 |

TABLE 22

| | | Outermost Surface Layer (A layer) | | | Middle Layer (B layer) | | | Underlayer (C layer) | | | | Base |
|---|---|---|---|---|---|---|---|---|---|---|---|---|
| | | Composition | Thickness [μm] | Deposition Amount [μg/cm²] | Composition | Thickness [μm] | Deposition Amount [μg/cm²] | Composition | Thickness [μm] | Deposition Amount [mg/cm²] | Heat Treatment Condition | Material Composition |
| Example | 96 | Sn—40Ag | 0.300 | 218.4 | Ag | 0.030 | 31.5 | Ni | 1.0 | 0.9 | none | Cu—30Zn (H) |
| | 97 | Sn | 0.300 | 218.4 | Ag—40Sn | 0.030 | 31.5 | Ni | 1.0 | 0.9 | none | Cu—30Zn (H) |
| | 98 | Sn | 0.300 | 218.4 | Ag | 0.030 | 31.5 | Ni—40Co | 1.0 | 0.9 | none | Cu—30Zn (H) |
| Target | | | 0.2< | 150< | | 0.001≤ | 1≤ | | | | | |

| | | Inserting/Extracting Force | | | | Gas Corrosion Resistance | | | | Solder Wetting | |
|---|---|---|---|---|---|---|---|---|---|---|---|
| | | Maximum Inserting Force [N] | Maximum Inserting Force/Maximum Inserting Force of Comparative Example 1 [%] | Contact Resistance [mΩ] | Heat Resistance Contact Resistance [mΩ] | Salt Spray Contact Resistance [mΩ] | Sulfurous Acid Gas Contact Resistance [mΩ] | Hydrogen Sulfide Contact Resistance [mΩ] | | Zero Cross Time (After Plating) [sec] | Zero Cross Time (After PCT Test) [sec] |
| Example | 96 | 4.56 | 76 | 1-3 | 1-3 | 1-3 | 1-3 | 1-3 | | 1-3 | 1-3 |
| | 97 | 4.74 | 79 | 1-3 | 1-3 | 1-3 | 1-3 | 1-3 | | 1-3 | 1-3 |
| | 98 | 4.74 | 79 | 1-3 | 1-3 | 1-3 | 1-3 | 1-3 | | 1-3 | 1-3 |
| Target | | | <100 | ≤10 | ≤10 | ≤10 | ≤10 | ≤10 | | ≤5 | ≤5 |

Examples 1 to 98 were metal materials for electronic components, which were excellent in all of the low insertability/extractability, low whisker formability, and durability.

Comparative Example 1 was a blank material.

Comparative Example 2 was fabricated by making thin the Sn plating of the blank material of Comparative Example 1, but was poor in the solder wettability.

Comparative Example 3 was fabricated by carrying out a Cu plating as the middle layer in comparison with Comparative Example 1, but was poor in the solder wettability after the PCT test.

Comparative Example 4 was fabricated by making thin the Cu plating carried out as the middle layer in comparison with Comparative Example 3, but was poor in the solder wettability.

Comparative Example 5 was fabricated by carrying out with no heat treatment in comparison with Comparative Example 4, but was poor in the solder wettability.

Comparative Example 6 was fabricated by carrying out a Cu plating as the underlayer in comparison with the blank material of Comparative Example 1, but exhibited no change in the property in comparison with Comparative Example 1.

Comparative Example 7 was fabricated by making thick the Ni plating carried out as the underlayer in comparison with the blank material of Comparative Example 1, but exhibited no change in the property in comparison with Comparative Example 1.

Comparative Example 8 was fabricated by carrying out with no Ag plating as the middle layer in comparison with Example 2, but in Comparative Example 8, the maximum value of the atomic concentration (at %) of Ag, Au, Pt, Pd, Ru, Rh, Os or Ir of the outermost surface layer (B layer) was 10 at % or lower in the depth measurement by XPS (X-ray photoelectron spectroscopy), and the solder wettability was poor.

Comparative Example 9 was fabricated by making thin the Sn plating as the outermost surface layer in comparison with Comparative Example 2, but in Comparative Example 9, the gas corrosion resistance was poor and the contact resistances after the sulfurous acid gas corrosion test and after the hydrogen sulfide gas corrosion test were above the target.

Comparative Example 10 was fabricated by reversing the plating order of Sn and Ag in comparison with Example 2, but was poor in the gas corrosion resistance and higher in the contact resistance after the hydrogen sulfide gas corrosion test than the target, because in a depth measurement by XPS (X-ray photoelectron spectroscopy), the position ($D_1$) where the atomic concentration (at %) of Sn or In in the outermost surface layer (A layer) indicated the maximum value and the position ($D_2$) where the atomic concentration (at %) of Ag, Au, Pt, Pd, Ru, Rh, Os or Ir in the middle layer (B layer) indicated the maximum value were present in the order of $D_2$ and $D_1$.

Comparative Example 11 was poor in the gas corrosion resistance and higher in the contact resistance after the hydrogen sulfide gas corrosion test than the target, because in a depth measurement by XPS (X-ray photoelectron spectroscopy), the position ($D_1$) where the atomic concentration (at %) of Sn or In in the outermost surface layer (A layer) indicated the maximum value and the position ($D_2$) where the atomic concentration (at %) of Ag, Au, Pt, Pd, Ru, Rh, Os or Ir in the middle layer (B layer) indicated the maximum value were $D_1=D_2$.

Comparative Example 12 was fabricated by reversing the Sn and Ag plating order in comparison with Example 57, but was poor in the gas corrosion resistance and higher in the contact resistance after the hydrogen sulfide gas corrosion test than the target, because in a depth measurement by XPS (X-ray photoelectron spectroscopy), the position ($D_1$) where the atomic concentration (at %) of Sn or In in the outermost surface layer (A layer) indicated the maximum value and the position ($D_2$) where the atomic concentration (at %) of Ag, Au, Pt, Pd, Ru, Rh, Os or Ir in the middle layer (B layer) indicated the maximum value were present in the order of $D_2$ and $D_1$.

Comparative Example 13 was poor in the gas corrosion resistance and higher in the contact resistance after the hydrogen sulfide gas corrosion test than the target, because in a depth measurement by XPS (X-ray photoelectron spectroscopy), the position ($D_1$) where the atomic concentration (at %) of Sn or In in the outermost surface layer (A layer) indicated the maximum value and the position ($D_2$) where the atomic concentration (at %) of Ag, Au, Pt, Pd, Ru, Rh, Os or Ir in the middle layer (B layer) indicated the maximum value were $D_1 \cong D_2$.

Comparative Example 14 was fabricated by carrying out with no Ag plating as the middle layer (B layer) in comparison with Example 78, but in Comparative Example 14, the maximum value of the atomic concentration (at %) of Ag, Au, Pt, Pd, Ru, Rh, Os or Ir in the middle layer (B layer) was 10 at % or lower in the depth measurement by XPS (X-ray photoelectron spectroscopy), and the gas corrosion resistance was poor, and contact resistance after the hydrogen sulfide gas corrosion test was above the target.

REFERENCE SIGNS LIST

10 METAL MATERIAL FOR ELECTRONIC COMPONENTS
11 BASE MATERIAL
12 UNDERLAYER (C LAYER)
13 MIDDLE LAYER (B LAYER)
14 OUTERMOST SURFACE LAYER (A LAYER)

The invention claimed is:

1. An electronic component metal material comprising:
a base material;
an A layer constituting an outermost surface layer on the base material, being formed of Sn, In or an alloy thereof and having a surface arithmetic average height (Ra) of 0.1 μm or lower; and
a B layer constituting a middle layer provided between the base material and the A layer and being formed of Ag, Au, Pt, Pd, Ru, Rh, Os, Ir or an alloy thereof, and satisfying the following (a) or (b):
(a) wherein the outermost surface layer (A layer) has a thickness larger than 0.2 μm; and
the middle layer (B layer) has a thickness of 0.001 μm or larger,
(b) wherein the outermost surface layer (A layer) has a deposition amount of the Sn, In or alloy thereof of larger than 150 μg/cm²; and
the middle layer (B layer) has a deposition amount of the Ag, Au, Pt, Pd, Ru, Rh, Os, Ir or alloy thereof of 1 μg/cm² or larger.

2. The electronic component metal material according to claim 1, wherein the outermost surface layer (A layer) has an alloy composition comprising 50 mass % or more of the Sn, In or a total of the Sn and In, and the other alloy component (s) comprising one or two or more metals selected from the group consisting of Ag, As, Au, Bi, Cd, Co, Cr, Cu, Fe, Mn, Mo, Ni, Pb, Sb, W, and Zn.

3. The electronic component metal material according to claim 1, wherein the middle layer (B layer) has an alloy composition comprising 50 mass % or more of the Ag, Au, Pt, Pd, Ru, Rh, Os, Ir or a total of the Ag, Au, Pt, Pd, Ru, Rh, Os and Ir, and the other alloy component(s) comprising one or two or more metals selected from the group consisting of Bi, Cd, Co, Cu, Fe, In, Mn, Mo, Ni, Pb, Sb, Se, Sn, W, Tl, and Zn.

4. The electronic component metal material according to claim 1, wherein the outermost surface layer (A layer) has a surface maximum height (Rz) of 1 μm or lower.

5. The electronic component metal material according claim 1, wherein when a depth analysis by X-ray photoelectron spectroscopy (XPS) is carried out, a position ($D_1$) where an atomic concentration (at %) of the Sn or In in the outermost surface layer (A layer) is a maximum value and a position ($D_2$) where an atomic concentration (at %) of the Ag, Au, Pt, Pd, Ru, Rh, Os or Ir in the middle layer (B layer) is a maximum value are present in the order of $D_1$ and $D_2$ from the outermost surface.

6. The electronic component metal material according to claim 1, wherein when a depth analysis by X-ray photoelectron spectroscopy (XPS) is carried out, the middle layer (B layer) has a maximum value of an atomic concentration (at %) of the Ag, Au, Pt, Pd, Ru, Rh, Os or Ir of 10 at % or higher.

7. The electronic component metal material according to claim 1, further comprising a C layer provided between the base material and the B layer and constituting an underlayer, and formed of one or two or more selected from the group consisting of Ni, Cr, Mn, Fe, Co, and Cu.

8. The electronic component metal material according to claim 7, wherein the underlayer (C layer) has an alloy composition comprising 50 mass % or more of a total of the Ni, Cr, Mn, Fe, Co and Cu, and further comprising one or two or more selected from the group consisting of B, P, Sn, and Zn.

9. The electronic component metal material according to claim 7, wherein when a depth analysis by X-ray photoelectron spectroscopy (XPS) is carried out, a position ($D_1$) where an atomic concentration (at %) of the Sn or In in the outermost surface layer (A layer) is a maximum value, a position ($D_2$) where an atomic concentration (at %) of the Ag, Au, Pt, Pd, Ru, Rh, Os or Ir in the middle layer (B layer) is a maximum value and a position ($D_3$) where an atomic concentration (at %) of the Ni, Cr, Mn, Fe, Co or Cu of the underlayer (C layer) is a maximum value are present in the order of $D_1$, $D_2$ and $D_3$ from the outermost surface.

10. The electronic component metal material according to claim 7, wherein when a depth analysis by X-ray photoelectron spectroscopy (XPS) is carried out, the middle layer (B layer) has a maximum value of an atomic concentration (at %) of the Ag, Au, Pt, Pd, Ru, Rh, Os or Ir of 10 at % or higher; and a depth where the underlayer (C layer) has an atomic concentration (at %) of the Ni, Cr, Mn, Fe, Co or Cu of 25% or higher is 50 nm or more.

11. The electronic component metal material according to claim 7, wherein the underlayer (C layer) has a thickness of 0.05 μm or larger.

12. The electronic component metal material according to claim 7, wherein the underlayer (C layer) has a deposition amount of the Ni, Cr, Mn, Fe, Co, Cu or a total of the Ni, Cr, Mn, Fe, Co and Cu of 0.03 mg/cm² or larger.

13. The electronic component metal material according to claim 1, wherein the outermost surface layer (A layer) has a thickness larger than 0.2 μm and smaller than 0.6 μm.

14. The electronic component metal material according to claim 1, wherein the outermost surface layer (A layer) has a deposition amount of Sn, In of larger than 150 μg/cm$^2$ and smaller than 450 μg/cm$^2$.

15. The electronic component metal material according to claim 1, wherein the middle layer (B layer) has a thickness of 0.005 to 0.1 μm.

16. The electronic component metal material according to claim 1, wherein the middle layer (B layer) has a deposition amount of the Ag, Au, Pt, Pd, Ru, Rh, Os, Ir or a total of the Ag, Au, Pt, Pd, Ru, Rh, Os and Ir of 4 to 120 μg/cm$^2$.

17. The electronic component metal material according to claim 7, wherein when a depth analysis is carried out by X-ray photoelectron spectroscopy (XPS), between a position ($D_1$) where an atomic concentration (at %) of Sn or In in the outermost surface layer (A layer) exhibits a maximum value and a position ($D_3$) where an atomic concentration (at %) of the Ni, Cr, Mn, Fe, Co, Cu or Zn of the underlayer (C layer) exhibits a maximum value, a region having 40 at % or more of Ag, Au, Pt, Pd, Ru, Rh, Os or Ir is present in a thickness of 1 nm or larger.

18. The electronic component metal material according to claim 1, wherein when an elemental analysis of a surface of the outermost surface layer (A layer) is carried out by a survey measurement by X-ray photoelectron spectroscopy XPS, a content of O is lower than 50 at %.

19. A connector terminal, wherein an electronic component metal material according to claim 1 comprises a contact portion.

20. An FFC terminal, wherein an electronic component metal material according to claim 1 comprises a contact portion.

21. An FPC terminal, wherein an electronic component metal material according to claim 1 comprises a contact portion.

22. An electronic component, wherein an electronic component metal material according to claim 1 comprises an electrode for external connection of the electronic component.

23. The electronic component metal material according to claim 8, wherein when a depth analysis by X-ray photoelectron spectroscopy (XPS) is carried out, a position ($D_1$) where an atomic concentration (at %) of the Sn or In in the outermost surface layer (A layer) is a maximum value, a position ($D_2$) where an atomic concentration (at %) of the Ag, Au, Pt, Pd, Ru, Rh, Os or Ir in the middle layer (B layer) is a maximum value and a position ($D_3$) where an atomic concentration (at %) of the Ni, Cr, Mn, Fe, Co or Cu of the underlayer (C layer) is a maximum value are present in the order of $D_1$, $D_2$ and $D_3$ from the outermost surface.

24. An electronic component metal material comprising:
a base material;
an A layer constituting an outermost surface layer on the base material and being formed of Sn, In or an alloy thereof and has a thickness larger than 0.2 μm, and has a deposition amount of larger than 150 μg/cm$^2$ and has a surface arithmetic average height (Ra) of 0.1 μm or lower; and
a B layer constituting a middle layer provided between the base material and the A layer and being formed of Ag, Au, Pt, Pd, Ru, Rh, Os, Ir or an alloy thereof, and having a thickness of 0.001 μm or larger and a deposition amount of the Ag, Au, Pt, Pd, Ru, Rh, Os, Ir or alloy thereof of 1 μg/cm$^2$ or larger.

* * * * *